US009282446B2

(12) United States Patent
Moshfeghi

(10) Patent No.: US 9,282,446 B2
(45) Date of Patent: Mar. 8, 2016

(54) LOCATION-AWARE CONTENT AND LOCATION-BASED ADVERTISING WITH A MOBILE DEVICE

(75) Inventor: Mehran Moshfeghi, Rancho Palos Verdes, CA (US)

(73) Assignee: GOLBA LLC, Rancho Palos Verdes, CA (US)

( * ) Notice: Subject to any disclaimer, the term of this patent is extended or adjusted under 35 U.S.C. 154(b) by 753 days.

(21) Appl. No.: 12/852,446

(22) Filed: Aug. 6, 2010

(65) Prior Publication Data

US 2011/0035284 A1 Feb. 10, 2011

Related U.S. Application Data

(60) Provisional application No. 61/231,902, filed on Aug. 6, 2009.

(51) Int. Cl.
*G06Q 30/02* (2012.01)
*H04W 64/00* (2009.01)
*H04W 4/02* (2009.01)
*H04W 4/20* (2009.01)

(52) U.S. Cl.
CPC ............. *H04W 4/206* (2013.01); *G06Q 30/02* (2013.01); *G06Q 30/0261* (2013.01); *H04W 4/02* (2013.01)

(58) Field of Classification Search
CPC ......... G06Q 30/02; H04W 64/00; H04W 4/02
USPC ................ 701/207; 455/456.1, 456.2, 456.3; 707/3; 705/14, 14.4, 14.71, 14.73
See application file for complete search history.

(56) References Cited

U.S. PATENT DOCUMENTS

| 6,580,914 | B1 | 6/2003 | Smith |
| 6,650,902 | B1 | 11/2003 | Richton |
| 2002/0091568 | A1 | 7/2002 | Kraft et al. |
| 2007/0022011 | A1* | 1/2007 | Altberg et al. ........... 705/14 |
| 2008/0086368 | A1 | 4/2008 | Bauman et al. |
| 2008/0132251 | A1* | 6/2008 | Altman et al. .......... 455/457 |
| 2008/0133336 | A1 | 6/2008 | Altman et al. |

OTHER PUBLICATIONS

Author Unknown, "Shorten that long URL into a tiny URL", TinyURL, date unknown but before Aug. 6, 2009, 3 pages, TinyURL, LLC. <URL:http://www.tinyurl.com>.
Author Unknown, "Organize your photos", Flickr from Yahoo!, date unknown but before Aug. 6, 2009, 2 pages, Yahoo! Inc. <URL:http://www.flickr.com/tour/>.

* cited by examiner

*Primary Examiner* — Sun Li
(74) *Attorney, Agent, or Firm* — Adeli LLP

(57) ABSTRACT

Many mobile devices such as smart phones can generate content ranging from text and audio, to images and videos that are taken with their cameras. These devices are also equipped with wireless radios and magnetometers that can be used to obtain position and orientation information. It is possible to allow the user of the mobile phone to add the position and orientation information of the mobile and date/time to the content that the mobile generates. Thus, emails, Short Message Service (SMS) messages, blog entries, audio recordings, and pictures/video that are generated with the mobile can be geotagged with the mobile's position and orientation, as well as the date and time. This information can then be used by a location-based contextual advertising server to provide more relevant on-line ads.

30 Claims, 16 Drawing Sheets

LOCATION-AWARE CONTENT AND LOCATION-BASED ADVERTISING WITH A MOBILE DEVICE

CLAIM OF BENEFIT TO RELATED APPLICATIONS

The present Application claims the benefit of U.S. Provisional Patent Application 61/231,902, entitled, "Location-Aware Content and Location-Based Advertising with a Mobile Device," filed Aug. 6, 2009. The contents of U.S. Provisional application 61/231,902 are hereby incorporated by reference.

BACKGROUND

Many web advertising sites use user profile information such as sex, age, marital status, education, and income to target online adverting to users. Some sites offer contextual advertising, where the ads are text or links that are relevant to the page that the user is accessing. For example, Gmail™ indexes email messages, and based on the message content adds text and links to related pages. Location-based contextual advertising can take contextual advertising one step further by targeting the ads to both context and the user's location.

Mobile devices such as smart-phones are information and communication devices that can generate text as well as multimedia content such as pictures, audio and video. There are situations when it is useful to know the exact time and location of the mobile when the content was generated. For instance, when users add pictures and video to their online albums, social networking sites (e.g. Facebook®, MySpace™, YouTube®, Twitter™ and LinkedIn®), and other web sites they manually describe and label the data, time and location of the content. Likewise, servers that handle email, Short Message Service (SMS), and blog entries note the time they received the content, rather than the time the content was created by a client device. Geotagging, which is the process of adding geographical identification data to multimedia content, solves these problems by adding self-describing metadata to the content. Some photo sharing web sites support geotagging.

Other systems have used positioning technologies to provide location-based information and advertising. For instance, a wireless network with base stations has been used to locate a subscriber and use the location to filter responses to information requests. Also, cellular base stations have been used to locate a cellular phone user and provide location-specific information to travelers such as airline and traffic information. Other systems have utilized GPS to locate a user and provide advertising that takes into account the user's location and profile. A location-based content targeted online advertising system have been described where one of the factors that determines the content of the advertisement is the location of the user as determined by a location server. Others have described a location-based advertising system that uses a GPS-based polling method to locate the user.

BRIEF SUMMARY

Some embodiments provide a method and system for utilizing geotagging information of user content to locate the user. Geotagging information of user content is used in some embodiments to enable location-based contextual advertising. Some embodiments use, in part, the geotagging of the multimedia content of mobile users to determine their location and provide location-based contextual advertising.

In some embodiments, a mobile device creates content for a user. Depending on the user's security settings, the mobile device's position and orientation as well as date and time are tagged to some or all of the created content. The mobile device then transmits the content to a server for storing the content in one or more databases. The mobile device then receives location-based advertising from one or more servers.

Some embodiments provide a method of providing location-based advertising to a mobile device. The method receives content and metadata associated with the content from the mobile device. The metadata includes a geographical identification of the content. The method sends location-based information to the mobile device based on the geographical identification of the content. In some embodiments the geographical identification includes latitude and longitude coordinates of a location where the content was generated. In some embodiments, the geographical identification includes an orientation of the mobile device when the content was generated, wherein sending location-based information comprises sending information to the mobile device based on the orientation of the mobile device.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
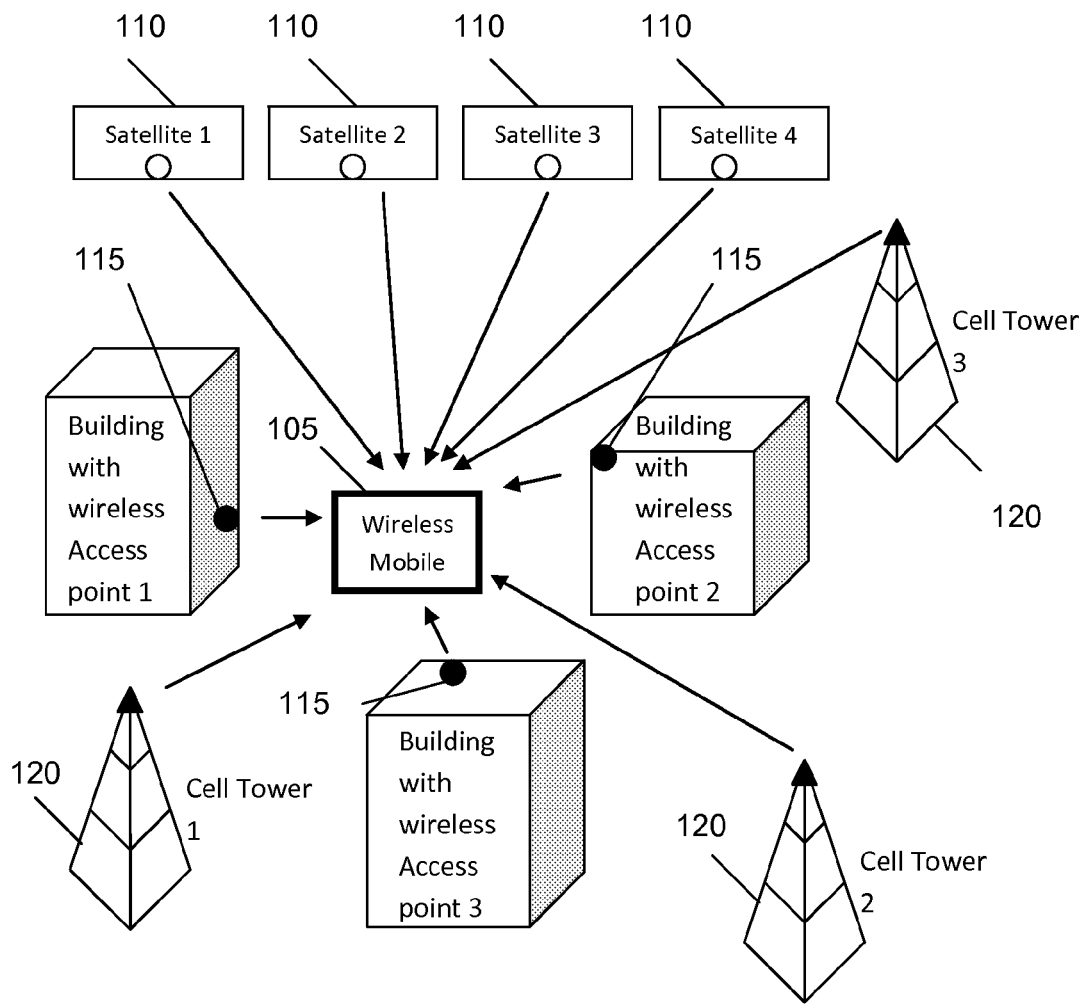
FIG. 1 conceptually illustrates a geographic area in some embodiments that has multiple wireless networks and a wireless mobile device that has one or more wireless transceivers that use such networks to communicate information and find its location.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method and system for utilizing geotagging information of user content to locate the user. Geotagging information of user content is used in some embodiments to enable location-based contextual advertising. Some embodiments use, in part, the geotagging of the multimedia content of mobile users to determine their location and provide location-based contextual advertising.

In some embodiments, a mobile device creates content for a user. Depending on the user's security settings, the mobile device's position and orientation as well as date and time are tagged to some or all of the created content. The mobile device then transmits the content to a server for storing the content in one or more databases. The mobile device then receives location-based advertising from one or more servers.

Some embodiments provide a method of providing location-based advertising to a mobile device. The method receives content and metadata associated with the content from the mobile device. The metadata includes a geographical identification of the content. The method sends location-based information to the mobile device based on the geographical identification of the content. In some embodiments the geographical identification includes latitude and longitude coordinates of a location where the content was generated. In some embodiments, the geographical identification includes an orientation of the mobile device when the content was generated, wherein sending location-based information comprises sending information to the mobile device based on the orientation of the mobile device.

In some embodiments, the metadata further includes a time when the content was generated and the method sends time sensitive information to the mobile device. When a difference between the time when the content was generated and a current time is more than a threshold, the method in some embodiments (1) determines a velocity of the mobile device based on a set of previously received content, (2) determines a direction of the mobile device based on the set of previously received content, and (3) interpolates (or extrapolates) the location of the mobile device based on the location of the generated content and the velocity and the direction of the mobile device.

In some embodiments, the method determines a context from the content received from the mobile device and narrows the location-based information based on the determined context. The location-based information includes location-based advertising and/or information requested by the mobile device.

In some embodiments, the mobile device does not transmit live tracking of the mobile device location. In some embodiments live tracking is not done because the mobile device does not support live tracking. In other embodiments, the user has set security preferences such that live tracking is disabled.

In some embodiments, the method sends a telephone link to the mobile device to contact a service provider associated with the location-based information. The telephone link in some embodiments is a link to a Voice over Internet Protocol (VoIP) server to make a call. In some embodiments, the method provides a map associated with the location-based information to the mobile device.

Several more detailed embodiments of the invention are described in sections below. Section I describes use of geotagging of content to enable location-based contextual information. Section II describes several examples of different embodiments of the invention that provide location-based and content-based information to a mobile device. Finally, section III provides a description of a computer system with which some embodiments of the invention are implemented.

I. Use of Geotagging of User Content to Enable Location-Based Contextual Information A. Wireless Positioning Methods FIG. 1 conceptually illustrates a geographic area in some embodiments that has multiple wireless networks and a wireless mobile device 105 that has one or more wireless transceivers that use such networks to communicate information and find the mobile device's location. For simplicity, what is referred in this specification as a mobile device, a mobile station, or mobile includes user equipments such as cellular telephones, personal communications service (PCS) telephones, wireless-enabled personal digital assistants (PDAs), wireless modems, laptop computers, tablet computers, smart phones, handheld devices that include short range radios (such as IEEE 802.11 or Bluetooth® but do not have cellular phones), digital still/video camera, or other wireless devices that are network capable and can generate content.

The networks include GPS, cellular (e.g., 2G, 3G, 4G), WLAN 802.11, Bluetooth®, Radio-Frequency Identification (RFID), Worldwide Interoperability for Microwave Access (WiMax), HD Radio™, Ultra-wideband (UWB), ZigBee, and 60 GHz. Each type of network can also have different implementations. For instance, the WLAN 802.11 standard can include 802.11b, 802.11a, 802.11g, and 802.11n. The cellular network can include Code Division Multiple Access (CDMA), CDMA2000, Wideband CDMA (WCDMA), Time Division Multiple Access (TDMA), Frequency Division Multiple Access (FDMA), and other multiple access techniques. A mobile device can communicate wirelessly with one or more of these networks. The communication can be downlink from the network base-stations (meaning satellites 110, WLAN or Bluetooth® base-stations 115, cellular towers 120, etc.) to the mobile device, or the uplink direction from the mobile device to the base-stations. FIG. 1 shows the downlink direction. The mobile device receives wireless signals and processes the signals into a location estimate. Typical information used for positioning includes Global positioning System (GPS) signals, Received Signal Strength Indicator (RSSI), Angle of Arrival (AOA), Time of Arrival (TOA), Time Difference of Arrival (TDOA), and Doppler shift. For instance, triangulation can be employed where multiple range or angle measurements from known positions are used to calculate the position of a device. We have some prior inventions in wireless positioning methods.

A wireless positioning method that works in both outdoor and indoor environments and can handle multipath propagation and indirect line of sight is described in U.S. patent application Ser. No. 12/852,443, entitled "Method and System for Determining the Position of a Mobile Device," filed concurrently with this application on Aug. 6, 2010. U.S. patent application Ser. No. 12/833,938, entitled "Method and System for Determining the Position of a Mobile Station," filed Jul. 9, 2010 describes a system that employs a known Radio Frequency (RF) transmission pattern to locate a receiver object. As the signal travels between a transmitter and a receiver the system calculates the time delay between the two. By repeating this process with different known coordinate transmitters it is possible to process the time delay information and calculate the unknown position coordinates of the receiver. U.S. patent application Ser. No. 12/059,558, entitled "Methods and Systems for Determining the Location of an Electronic Device," filed Mar. 31, 2008, published as U.S. Patent Publication 2009-0243932 describes a system that employs multi-tone OFDM signals for locating an object. As an OFDM signal travels between a transmitter and a receiver the system calculates the residual phase difference between pilot tone frequency pairs. By repeating this process with different known coordinate OFDM transmitters (or receivers) it is possible to process the residual phase differences to calculate the unknown position coordinates of an OFDM transmitter (or receiver).

In U.S. patent application Ser. No. 11/940,219 entitled, "Systems and Methods of Assisted GPS," filed Nov. 14, 2007, and published as U.S. Patent Publication 2009-0121927, describes wireless access points that send differential assistance data to GPS receivers which are integrated into cellular chipsets and other chipsets. Errors caused by multipath travel of the GPS signals are reduced by using fixed location reference access point receivers. Contents of U.S. application Ser. No. 12/833,938, U.S. patent application Ser. No. 12/852,443, U.S. Patent Publication 2009-0243932, and U.S. Patent Publication 2009-0121927 are hereby incorporated by reference.

B. Geotagging User Content

Figure 2:
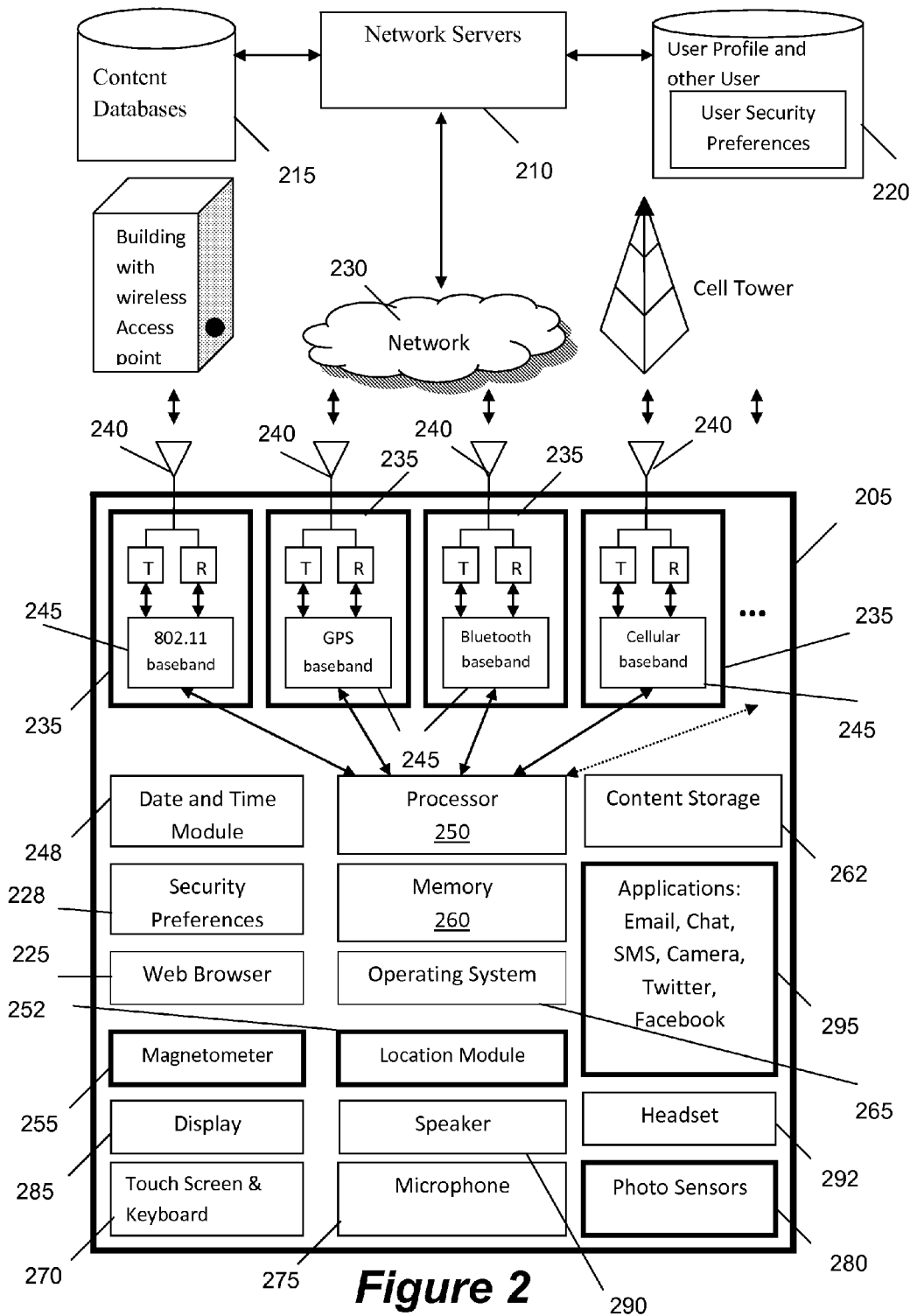
FIG. 2 conceptually illustrates a wireless mobile device in some embodiments that creates multimedia content, tags the content with position/orientation/timestamp information, and uploads the content to a set of location-based application servers which in turn updates content databases and user databases.
Figure 3:
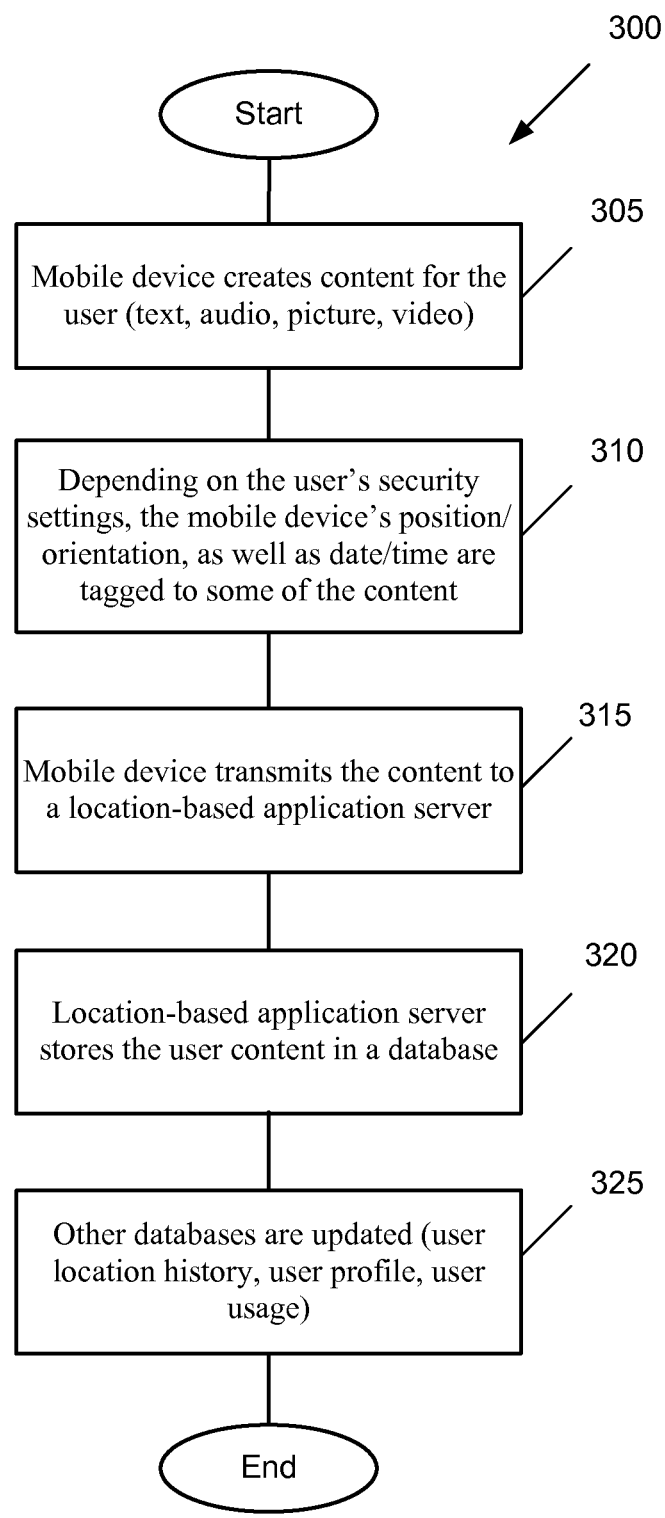
FIG. 3 conceptually illustrates a process for tagging and storing content generated by a mobile device in some embodiments.

FIG. 2 conceptually illustrates a wireless mobile device 205 of some embodiments that creates multimedia content, tags the content with position/orientation/timestamp information, and uploads the content to a set of location-based application servers 210 which in turn update content databases 215 and user databases 220. The corresponding flow diagram is described by reference to FIG. 3. FIG. 3 conceptually illustrates a process 300 for tagging and storing content generated by a mobile device in some embodiments. As shown in FIG. 3, the wireless mobile device 205 generates (at 305) content. For instance, the user takes a picture, sends an email message, sends an SMS, records video, or records audio.

Next, depending on the user's security settings, the multimedia content is geotagged (at 310). User security settings are described by reference to FIG. 4 below. In some embodiments, geotagging is done by adding geographical identification to media content such as photographs, video, audio, and text. In some embodiments, geotags are added to the content as metadata. Different embodiments use one or more of latitude and longitudes coordinates, orientation, altitude, bearing, distance, place names, and the like to geotag content. For simplicity, throughout this Specification, the terms location and position are used to also refer to one or more of the latitude and longitudes coordinates, orientation, altitude, bearing, distance, place names, and the like that are used to geotag content. In some embodiments the content is timestamped (at 310), e.g., by using date and/or time, in addition or in lieu of geotagging.

In some embodiments, the user of the mobile device uses a web browser 225 or program (that runs on the mobile's operating system) and a network 230 (cellular or other wireless networks that connect to wired networks) to authenticate herself to a set of networked servers 210, and upload (at 315) the multimedia content to databases 215-220 that are connected to the networked servers. There can be several network servers, databases and mobile devices; FIG. 2 shows only one of each for simplicity. The servers perform different functions and can be separate processes that run on separate computers, or a single computer. Likewise, there are several databases that store different kind of information. Each database can be stored on a single physical storage device or spread across multiple storage devices. In some embodiments, the networked servers or some other servers run location-based applications that allow the user to store (at 320) and share multimedia content with others. The user does not have to manually label the location, orientation and creation time of the content if the content is geotagged. An authorized client device or an authorized server can then use an application or a web browser running on its operating system to connect to the network servers and access information, including some of the uploaded multimedia content. The network servers also include a location-based contextual ad server that provides ad (i.e., advertisement) based on the location and context of the client. Other databases such as user location history database, user profile database, user usage database are also updated (at 325). Different databases used in some embodiments are further described by reference to FIG. 5 below.

The mobile device in FIG. 2 includes one or more wireless radio devices 235 with antenna 240 that transmit and receive electromagnetic waves, and baseband transceivers 245 that process the information. A processor 250 controls the radios. The mobile device has a location module application 252 that processes the radio signals and calculates the position of the mobile at any given time. The mobile device also has a magnetometer sensor 255 that provides the orientation of the mobile in three dimensions. The memory 260 has read-only memory (ROM) for program storage and random access memory (RAM) for running programs. The operating system 265 interfaces the hardware with the user and manages resources. Input devices of the mobile include keyboard and/or touch screen 270, microphone 275, and a camera photosensor 280 for still pictures and video. Output devices include a display 285, speaker 290, and wired or wireless headsets 292. The mobile device has a number of dedicated applications 295 such as email, chat, SMS, and camera. The mobile device also has a browser 225 that is used to browse information on the intranet/Internet and download other applications from the network. There is a bus (not shown) that links all these components with the processor and memory. A section 262 of the memory (shown separately) is dedicated to local storage of content such as pictures, video, audio, and email.

Some of the applications in FIG. 2 use location module 252 to tag the generated content with location information, and magnetometer 255 to tag the content with three-dimensional (3D) orientation information. They also use date and time module 248 to tag the content with a date and time stamp. The location module in FIG. 2 provides latitude and longitude information or some other coordinate system. In some embodiments, the location module also converts the latitude/longitude information to street addresses for maps such as Google™ Maps. The location coordinates, 3D orientation, and data/time information can be included in the generated content, coded in the filename of the content, or stored and sent in a separate metafile or message that is associated with the content. Thus, content generated by applications such as email, chat, SMS, social networking tools, and the camera can be complemented with location, orientation and date/time information if the user chooses to do so by setting the appropriate security preferences. Some of these security preferences may be stored locally on the mobile, while others may be stored on user profile databases that are accessible to networked servers that provide applications (e.g. email, chat, social networking)

One of ordinary skill in the art will recognize that process 300 is a conceptual representation of the operations that are performed in some embodiments. The specific operations of process 300 may not be performed in the exact order shown and described. The specific operations may not be performed in one continuous series of operations, and different specific operations may be performed in different embodiments. Furthermore, the process could be implemented using several sub-processes, or as part of a larger macro process.

C. Setting Security Preferences

Figure 4:
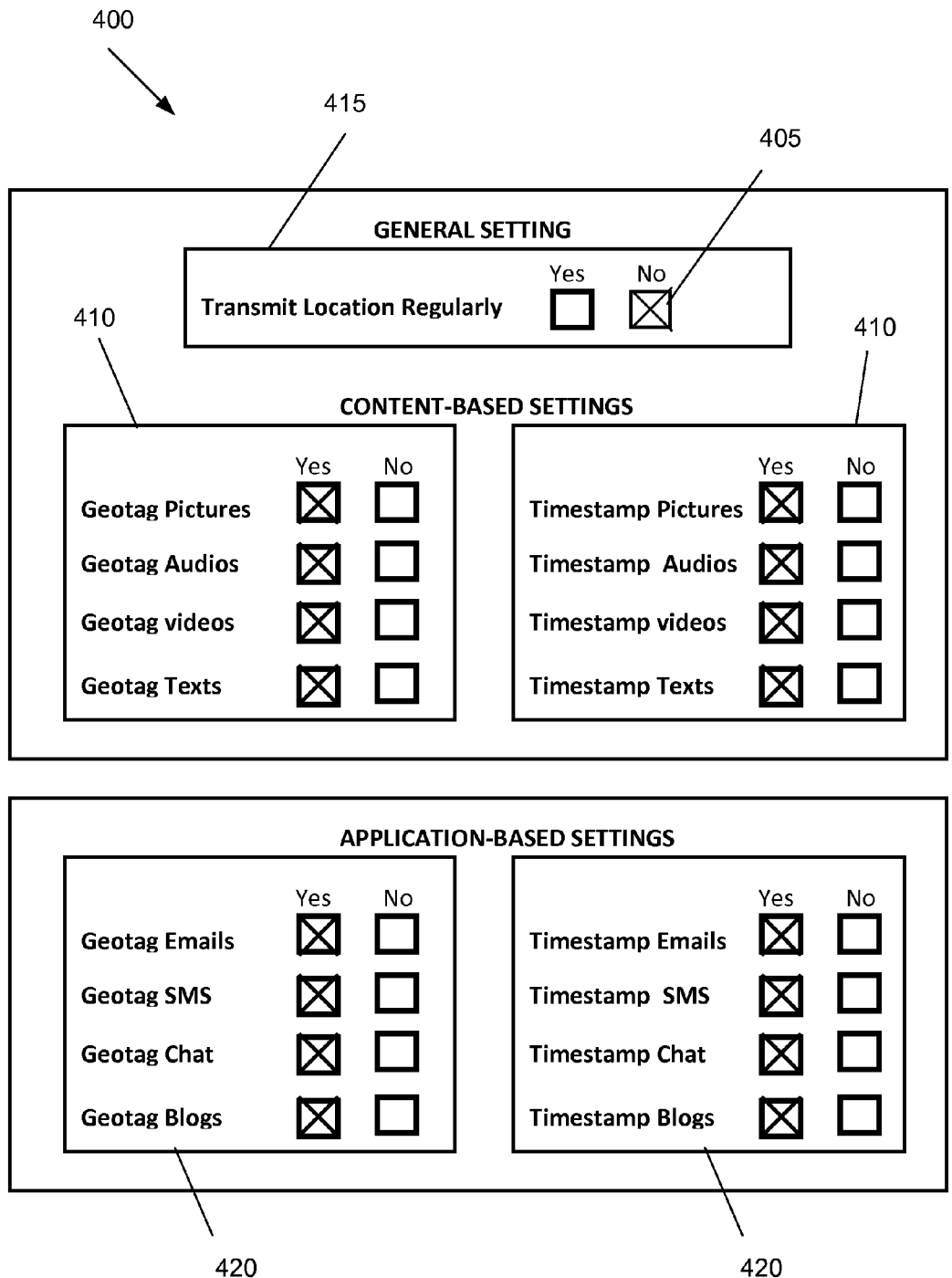
FIG. 4 conceptually illustrates an example of a graphical user interface for setting security preferences in some embodiments.

In some embodiments, the mobile user can change the settings in her security preferences 228 in order to enable or disable the broadcasting of her mobile's position and orientation for live tracking FIG. 4 conceptually illustrates an example of a graphical user interface 400 for setting security preferences in some embodiments. As shown, the user has disabled (by checking box 405 of general setting 415) the continuous transmission of her location and orientation for privacy reasons. In other words, the user has disabled live tracking of the mobile device's location. However, the user has set the security preference settings to enable the content that she produces (pictures, audio, video and text are shown as example) to be time-stamped (by checking the timestamp boxes of content-based settings 410) and geotagged (by checking the geotag boxes of content-based settings 410) with location/orientation information. Another way to achieve control of geotagging and time-stamping of content is to do it at the application-level. This is also shown in FIG. 4, where the user has enabled geotagging (by checking the geotag boxes of application-based settings 420) and time-stamping (by checking the timestamp boxes of application-based settings 420) of email, chat, SMS, blogging content, and the like. This level of control allows the user to make finer trade-offs of security for benefits associated with location-based content and applications.

Instead of allowing the mobile device to broadcast the position and orientation continuously, the user can now control it at the level of content creation. There are several different combinations of these settings. For instance, some embodiments allow live location tracking as well as geotagging all content, or allow live location tracking but disable content geotagging, etc. Some embodiments provide finer security preferences in the mobile device's security preferences settings, such as being able to disable content tagging at certain times in the day/week/year or certain location areas. The geotagged contents provide the user's locations at the time-stamped times, and once the user sends them to a server the server can extract that information.

The user can further control privacy on the server by setting user security preferences in the user profile database. These settings allow the user to show her location to certain people that she chooses but hide it from others. Privacy can be controlled further by providing user security preference settings for showing only approximate location instead of exact location (e.g. show city but not street address, or show street name but not number).

D. Using Geotag and Timestamp of User Content to Determine User Location And Provide Location-Based Information FIG. 5 conceptually illustrates a system of some embodiments that uses geotag and timestamp information from user-provided content to determine user location and provide contextual location-based information. Although many examples are given below that refer to location-based information as location-based advertisement, location-based information in some embodiments is provided in response to the user requests for directions, location of a particular service (e.g., emergency room service) in an area, etc. The flow diagram for content display with contextual location-based advertising is described by reference to FIG. 6.

Figure 6:
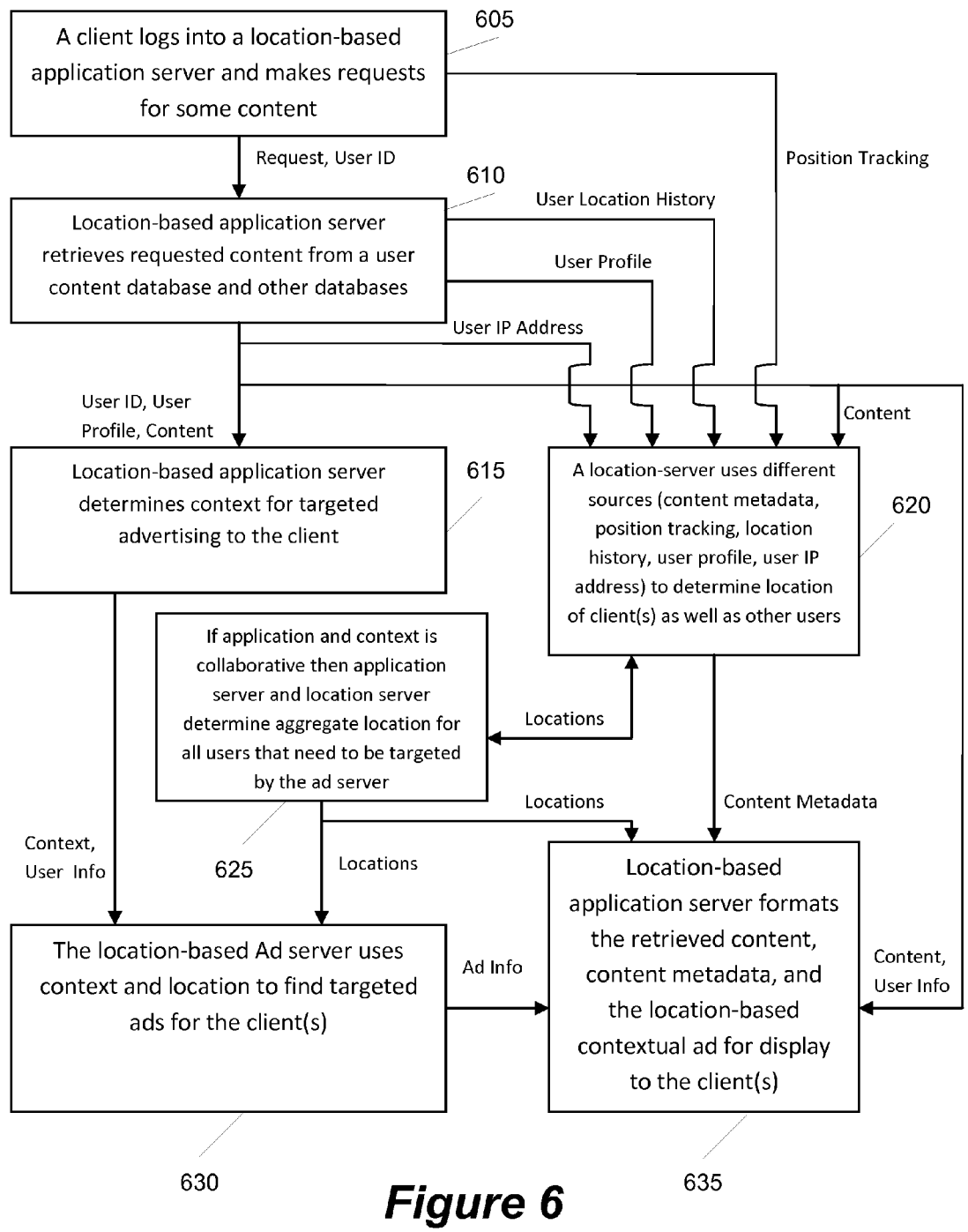
FIG. 6 conceptually illustrates a flow diagram for providing location-based contextual advertising in some embodiments.

FIG. 6 conceptually illustrates a flow diagram for providing location-based contextual advertising in some embodiments. As shown in FIG. 6, user of mobile A 505, user of mobile B 510, or some other wireless or wired client use a public network 515 and provide (at 605) some identifying information or credential, such as User ID and password, in order to authenticate the mobile device to communicate with an application server 520 for location-based applications such as email, chat, SMS, and social networking. The application server can access user content database 570 and present to authorized users some of the user provided content, as well as content 577 served by other networked information servers 575 (e.g. other Internet sites such as ratings, news, weather, etc). After a client has successfully logged into the application server the server can access other databases that contain information about the user (such as a user profile database 525 and a user location database 530) and provide that information (at 610) to other servers such as the location server 535 that determines the client's location.

User profile database 525 stores user registration information for a particular location-based application service (Email, SMS, social networking, etc). Typical user information that is stored includes name, password, address, billing information, user interests and preferences. User location database (or user-location history database) 530 includes entries for position/orientation and the recording time of the location/orientation for each user. The location-based application server takes advantage of the user's interest/preferences from the user profile database 525 and the content that it is serving the client to determine context for serving targeted ads. User interest and preferences are expressed as keywords in the user profile database. Location-based application server 520 also indexes the content that is being seen by the client to determine context. There are many different indexing and grouping algorithms that can be used to determining context. For example, if an email says "How about Chinese food for lunch" then the words "Chinese", "food"

and "lunch" could be used to determine the context and search for ads that contain those keywords, and further narrow the ads to those businesses that are geographically close to the location of the client. If the user profile interest indicates that the user's diet is vegetarian then the application server can narrow down the ad search further by instructing the ad server to search for Chinese restaurants that offer vegetarian dishes.

The location information of the mobile user is determined by a location server 535. The location server uses (at 620) different techniques to locate a client. When the location is approximate the location server in some embodiments outlines an area, such as a circle with a center and a radius, or some other shape such as a rectangle or a polygon. The direct approach is where the user's security preferences allow live position tracking and the mobile device's magnetometer/location module transmits the mobile device's orientation/position information to the location server at regular time intervals or as polled or requested by the location server. In some embodiments, the location server also stores this information in the user location database 530. The live tracking option, however, can be disabled by the settings of the security preferences of the mobile's user. An indirect approach is where the user does not allow live position tracking but does allow position/orientation and/or time-stamping of the content that she creates with different applications. With this approach, some or all of the user-provided content contain geotag and time-stamp information. The location server then either extracts the position/orientation and time-stamp information from the user-provided content as new content is added and stores that in the user location database, or does it on the fly as needed.

In the absence of live location tracking or recent user provided geotagged content, the location server uses other indirect means to locate the client. In some embodiments, the IP address of the client's request is looked up in an IP-Address-Position database (not shown) to map it to a location, town or zip code. Some embodiments use the address that is stored in the user profile database, or the last address/orientation in the user location database. Some embodiments also use an indirect method of position calculation by doing interpolation based on previous user location history positions. The tagged contents provide the position of the user at various time instances. It is then possible to calculate velocity and direction and use simple linear methods or more complex algorithms (e.g. Baysian or Kalman Filtering) to approximate the future position of the user based on previous positions. A simple example of using only the last two position measurements is as follows. Suppose the user was at (x, y) position (0, 0) two hours ago and at position (1, 0) one hour ago. Then the user is traveling 1 unit in the x direction each hour and current position can be estimated to be (2, 0).

The output of the location server can be a circular area with a center and a radius, where the radius defines the confidence in the position. The user (or users if the ad is targeted to a group of people) can be anywhere in the circle. The greater the confidence in the position, the smaller the radius is. When the mobile device is allowing location tracking, the mobile device orientation and position are very current and we can even infer which store the mobile device is facing towards. When position tracking is disabled but the user has uploaded a geotagged content, the accuracy of the user's location decreases (and the radius increases) with increasing elapsed time since content was created and time-stamped. Therefore, the time of the mobile's position/orientation measurement or tagging demonstrates the degree of confidence in the position/orientation.

Figure 5:
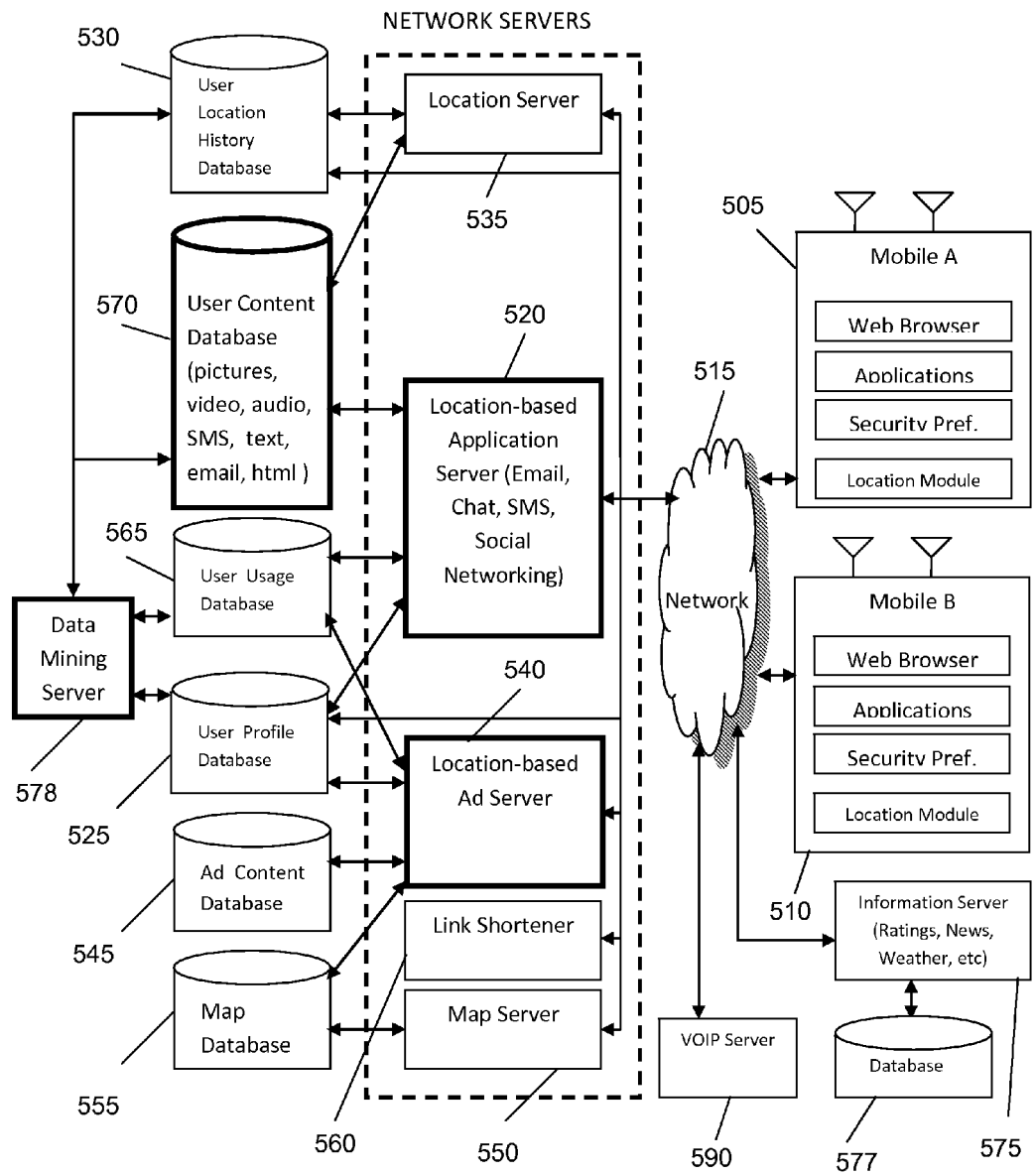
FIG. 5 conceptually illustrates a system of some embodiments that uses geotag and timestamp information from user-provided content to determine user location and provide contextual location-based advertising.

FIG. 5 also shows a location-based ad server 540 that provides ads to users of the location-based application. The location-based application server 520 uses content indexing and user profiles to provide (at 615) the ad server with context. Location server 535 provides location information to location-based ad server 540. The ad server can access an ad content database 545 which stores information such as business names, addresses, and ads and coupons for their products and services. The ad content database is routinely updated by an administrator with new and up-to-date ad content. This database may be a relational database so that the ads can be searched for keywords and the location of the business. The ad server searches the ad content database to find (at 630) contextual advertisements that match the user context and location. Advertisers that pay a premium get featured ads with a better presentation such as higher listing order (if several ads are presented), better screen position, larger fonts, etc.

The location-based ad server then sends (at 630) to the location-based application server ad information such as the text of the ads, the positions of the businesses/services, their telephone numbers, links to their ratings by users, links to the advertisers' web sites, and ad coupons that can be saved for later redemption.

The application server also has the content, the metadata of the content (which includes position/orientation and timestamp information), users' profile information and the location of the users. In some embodiments, the application server optionally adds the user's name to the text of the ad to personalize it and uses (at 635) different presentation methods for display the content together with the advertisement. Some examples are described below by reference to FIGS. 11-15. The advertisement is displayed as a pop-up, a banner ad, or an embedded part of the display window. When there are several relevant businesses in the vicinity of the user some embodiments display the closest one while other embodiments rank and display the ads in the order of closeness to the user's location. In some embodiments, the application server uses a map server 550, which can access a geographical map database 555, to generate static or dynamic maps, where the position/orientation of the content/users and the ad location are displayed in a single map. Some embodiments show the radius that defines the confidence in the position as a circle around the location. The map server in some embodiments generates a map with driving directions (or uniform resource locator links to driving directions) that starts with the location of the user and ends at the location associated with the advertisement. The ads also include the telephone number of the advertiser in some embodiments so that the mobile user can call them. This can be automated if the ad includes a Uniform Resource Locator (URL) or a similar link that includes the advertiser's telephone number as a parameter and points to a Voice over Internet Protocol (VoIP) server 590 so that when the link is clicked it will invoke an application (e.g. Skype) and make the call.

A URL link shortener 560 is used by the application server in some embodiments to create unique short URL aliases that redirect to long URLs that have name/value pairs (e.g. for GPS coordinates, orientation, date, and time). These shorter links are more suitable for embedding in ads and maps. The application server also formats the ad and provides a URL link that uses a rating server on the Internet that provides ratings on the recommended ad products/businesses/service. The users can also use this link to provide their ratings if they use the product/business/service.

In some situations more than one user are collaborating on a task (such as an email thread between groups of people discussing where to go for lunch). There are at least three options for targeting the location of the ad: 1—Target the sender's locations; 2—Target the recipient's locations; and 3—Target the location of all or a subset of the group. Which option is pursued depends on the application and the context. The disclosed system can handle all of these cases. FIG. 6 shows option 3 where the application server and the location server calculate the location of all the users involved in the task and find (at 625) the aggregate central location to all of them, and use that as the location for the group. The ad is then based on the location of all the users involved in the task, but still personalized to each user (i.e. direction links are personalized based on the position of each user, each user sees their name on the ad targeted to them, etc.). The application server also uses the map server 550 to generate a map showing all the collaborating users/content. In another embodiment, the context of the collaboration task determines the location for the location-based ad. For instance, if there is discussion between two people in Santa Monica about going on a vacation to Cancun, Mexico, then the application server may override the location of the two users and target the ads based on the location from the context (i.e. use Cancun as the location and provide ads about things to do in Cancun, as opposed to ads for travel agents in Santa Monica that are close to them).

In FIG. 5 a user usage database 565 records the interactions of users with the location-based application and the location-based ad server. For example, the database logs requests with date/time, uploaded content, searches, clicked ads/coupons, and transactions. In some embodiments, data mining server 578 accesses the user usage database 565 and the user's location history (e.g., dates/times and locations from the user location database) to analyze how effectively the user interacts with the application and how successful the targeted advertisements are. The mining server may also employ image/video content retrieval and classification methods to classify the content of the user's image/video content, as well as indexing the textual contribution of the user to infer about the interests of the user. The mining server can then update the user profile database in order to update the user's interests and preferences. The ad server and application server can then use the profile database to personalize and target the ads for the user.

FIG. 5 demonstrates the example for one location-based application server (e.g. social networking). In practice users register with different services for different applications (email, social networking, etc) and so user databases and content are distributed across multiple servers and databases. Even for the same application a logical database can be implemented with multiple databases across several physical servers.

Figure 7:
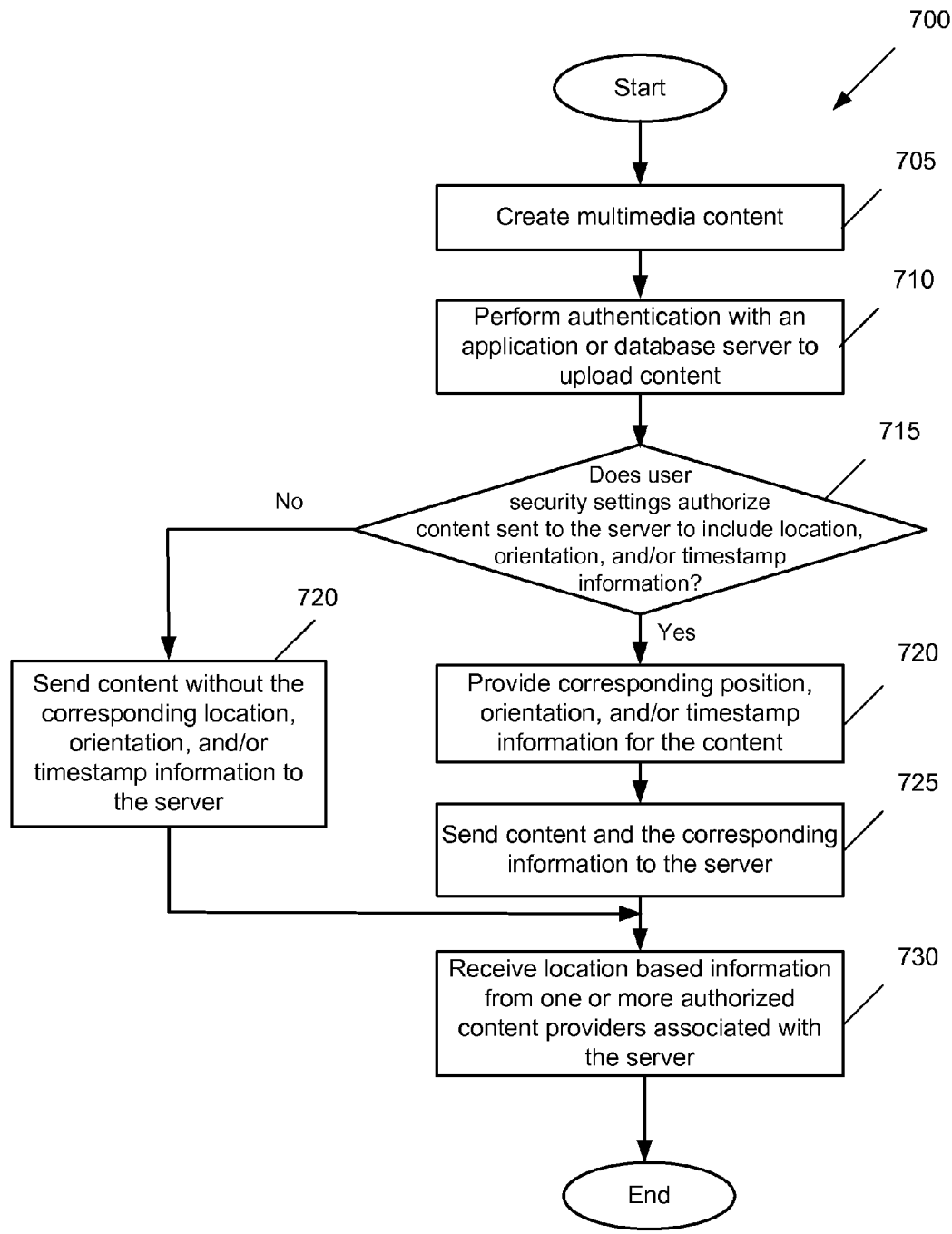
FIG. 7 conceptually illustrates a process performed by a mobile device to send content to one or more servers and receive location-based information in some embodiments.

FIG. 7 conceptually illustrates a process 700 performed by a mobile device to send content to one or more servers and receive location-based information in some embodiments. In some embodiments, process 700 is utilized by a mobile device as described in FIGS. 2 and 5 above. In some embodiments, process 700 is performed to tag content while the user security settings do not allow regular transmission of location (e.g., when box 405 in FIG. 4 is checked). In other embodiments, process 700 is performed to tag content while the user security settings allow regular transmission of location.

As shown, the mobile device creates (at 700) multimedia content when e.g., a user takes a picture, sends SMS or email, records audio, etc. Next, the mobile device performs (at 710) authentication with an application, database, or web server to upload content.

The process then determines (at 715) whether the user security settings authorize content sent to the server to include geotags such as location, orientation, etc. and/or timestamp information. When the security settings do not authorize such tagging, process 700 sends (at 720) content to the server without the corresponding tags. The process then proceeds to 730 which is described below.

On the other hand, when the security settings allow tagging of some or all of content data, the process provides (at 720) the corresponding information (e.g., position, orientation, and/or timestamp) for the content. At described by reference to FIG. 4 above, security settings in some embodiments allow a user to selectively determine which type of content or content generated by which application can be geotagged and/or time tagged.

The process then sends (at 725) content and the corresponding information (e.g., in the form of metadata) to the server. At a later time, the process receives (at 730) location-based information (e.g. advertisement) from one or more authorized providers associated with the server. The process then ends. As shown, even when the mobile device sends (at 720) content that is not tagged, if the security settings were previously set to allow tagging, the security settings were set to allow tagging for different type of content, or live tracking is on, the mobile device can still receive location-based information (at 730).

One of ordinary skill in the art will recognize that process 700 is a conceptual representation of the operations that are performed in some embodiments. The specific operations of process 700 may not be performed in the exact order shown and described. The specific operations may not be performed in one continuous series of operations, and different specific operations may be performed in different embodiments. Furthermore, the process could be implemented using several sub-processes, or as part of a larger macro process.

Figure 8:
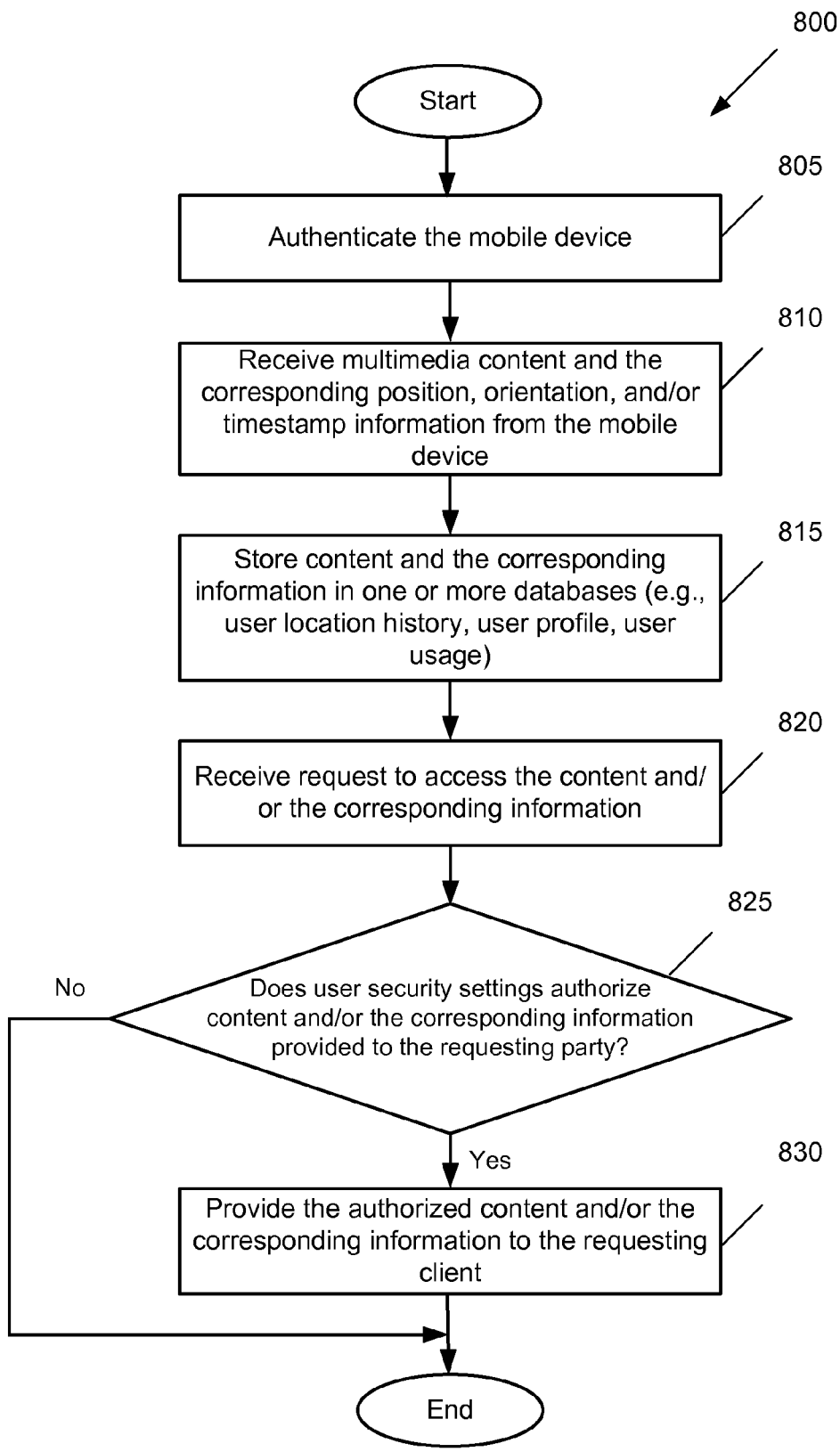
FIG. 8 conceptually illustrates a process performed by one or more servers in some embodiments to receive content from a mobile device and provide the information to one or more authorized servers.

FIG. 8 conceptually illustrates a process 800 performed by one or more servers (e.g., by the location-based application server 520) in some embodiments to receive content from a mobile device and provide the information to one or more authorized servers. As shown, the process receives credentials from the mobile device and authenticates (at 805) the mobile device to access the servers. Next, the process receives (at 810) multimedia content from the mobile device. As described above, depending on the security settings of the mobile device some or all of the content is geotagged and/or time tagged.

Next, the process stores (at 815) content and the corresponding information in one or more databases (e.g., user location history 530, user profile 525, user usage 565 databases). In some embodiments, the corresponding information is stored in the form of metadata associated with the multimedia content. In some embodiments, the process associates additional security information (e.g., as metadata) to indicate which other users or servers are authorized to access content that is received from this particular mobile device or this particular user. In some embodiments, this additional security information is received from the mobile device. In other embodiments, the additional security information is retrieved from a database (e.g., the user profile database 525).

The process then receives (at 820) a request to access the content and/or the corresponding information. The requesting party can be the same mobile device requesting to download the information at a later time or an ad server (e.g., location-based ad server 540) requesting the content and its associated metadata to create location-based information for the same mobile device or a different client. The process determines (at 825) whether the security setting associated with the content and/or the corresponding information allow providing the requested information to the requesting party. When the security setting associated with the content does not allow the requesting party to receive the information, the process ends. Otherwise, when the security settings associated with the content allow the requesting client to receive part or all of the requested information, the process provides (at 830) the authorized content and/or the corresponding information to the requesting party. The process then ends.

One of ordinary skill in the art will recognize that process 800 is a conceptual representation of the operations that are performed in some embodiments. The specific operations of process 800 may not be performed in the exact order shown and described. The specific operations may not be performed in one continuous series of operations, and different specific operations may be performed in different embodiments. Furthermore, the process could be implemented using several sub-processes, or as part of a larger macro process.

Figure 9:
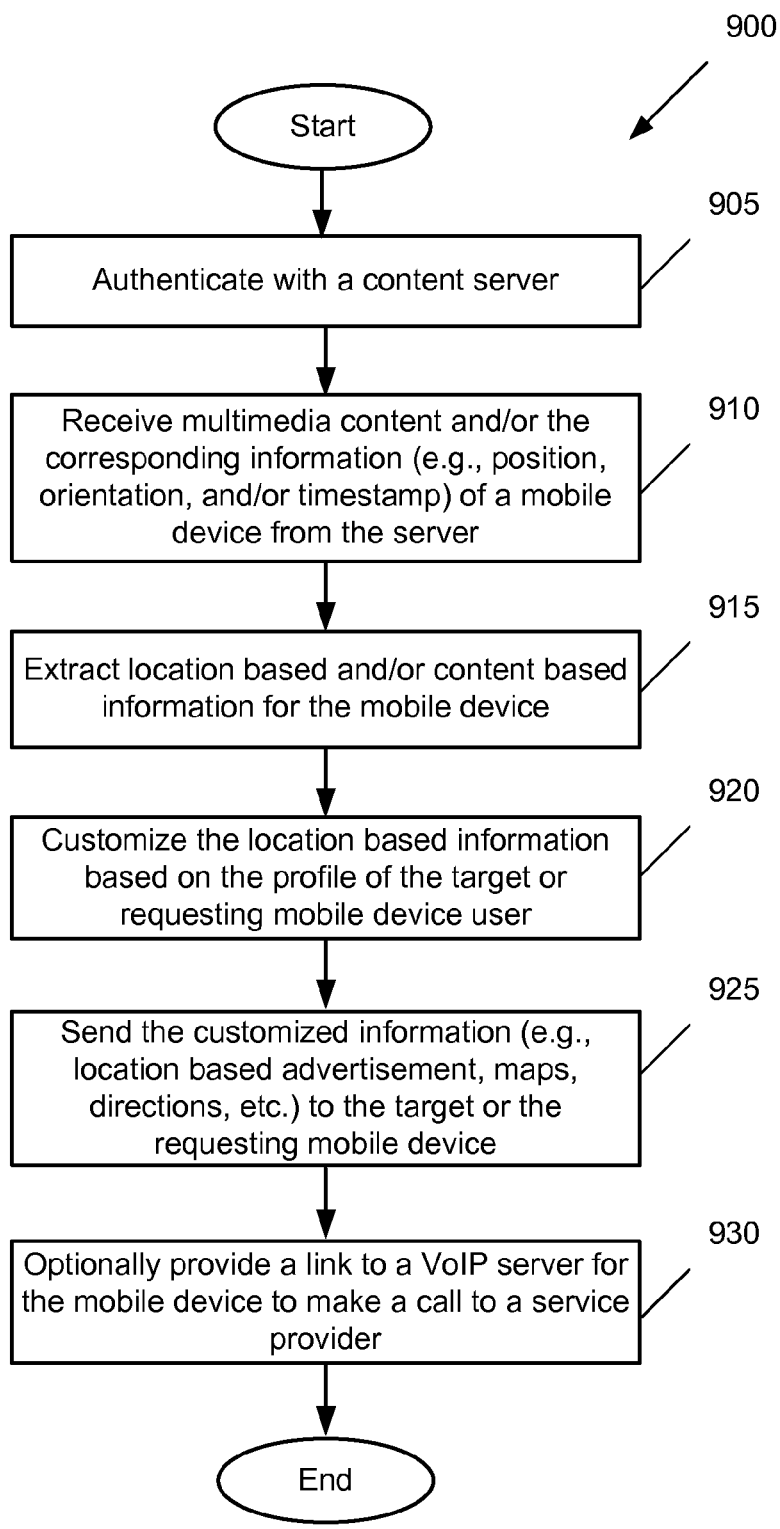
FIG. 9 conceptually illustrates a process performed by one or more servers in some embodiments to receive content from a mobile device and provide location-based information to the same or different clients.

FIG. 9 conceptually illustrates a process 900 performed by one or more servers in some embodiments to receive content previously generated by a mobile device and provide location-based information to the same mobile device or different clients. In some embodiments, process 900 is performed by a server (e.g., an ad server 540 or a map server 550) that receives the content and/or metadata related to location or time and provides location-based information (e.g., ads or directions) to a client. In some embodiments, process 900 is started when a server is going to send location-based information to a target mobile device or when the server has received request for information from a requesting mobile device.

As shown, the process authenticates (at 905) the requesting server with the content server. The process then receives multimedia content and/or the associated metadata from the content server. Next, the process extracts (at 915) location and/or time information from the received content. The process then customizes (at 920) the location-based information for the target or the requesting mobile device based on the information stored in the profile of the user of the mobile device.

The process then sends (at 925) the customized information (e.g. location-based advertisement, maps, directions, etc.) to the target (or the requesting) client. The target or the requesting client is either the same mobile device that generated the content and the associated metadata or a different client. Several examples of different scenarios for sending location-based information to one or more mobile devices are described in the following sections. The process optionally provides (at 930) a link to a VoIP server 590 for the receiving mobile device to make a call to a service provider. The process then ends.

One of ordinary skill in the art will recognize that process 900 is a conceptual representation of the operations that are performed in some embodiments. The specific operations of process 900 may not be performed in the exact order shown and described. The specific operations may not be performed in one continuous series of operations, and different specific operations may be performed in different embodiments. Furthermore, the process could be implemented using several sub-processes, or as part of a larger macro process.

Figure 10:
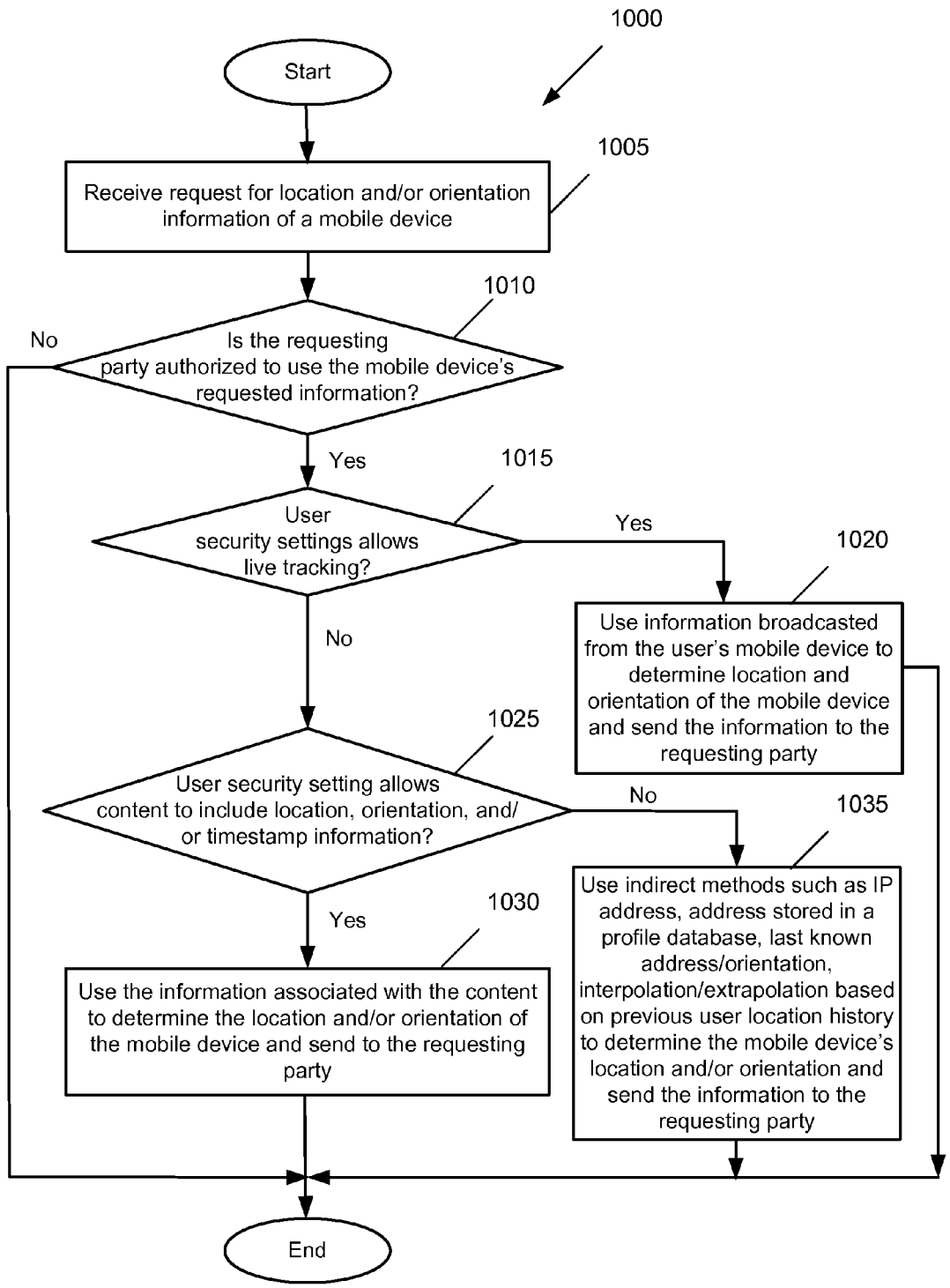
FIG. 10 conceptually illustrates a process performed by one or more servers to provide location information of a mobile device to a requesting party in some embodiments.

FIG. 10 conceptually illustrates a process 1000 performed by one or more servers to provide location information of a mobile device to a requesting party in some embodiments. Process 1000 is performed, e.g., by a location server 535 that receives a request from a location-based ad server 540 or a map server 550 that is performing process 900. As shown, the process receives (at 1005) a request for location and/or other similar information (e.g., orientation, closes address, latitude, longitude, etc.). The process determines (at 1010) whether the requesting party is authorized to use the requested information about the mobile device.

When the process determines that the requesting party is not authorized to receive the requested information, the process ends. Otherwise, the process determines (at 1015) whether the security settings of the mobile device allow live tracking and live tracking data is available. When the security settings allow live tracking, the process uses (at 1020) information received from the mobile device to determine location or other related information of the mobile device. Depending on the mobile device's settings, when the live tracking is allowed, the location information is broadcasted by the mobile device, periodically sent to a certain servers, or is provided upon request. The process then ends.

Otherwise, when live tracking is not allowed, the process determines (at 1025) whether security settings of the mobile device allow content to include some or all of the requested information (e.g., whether geotagging of some content is allowed). When content is allowed to include the requested information, the process uses (at 1030) the information associated with the content to determine the location and/or other requested information of the mobile device and sends the information to the requesting party. The process then ends. In some embodiments, the process considers the time the content was generated and refines the location estimation based on how old the content is. In some embodiments, the process uses prior locations of the mobile device and determines an estimate of the direction and speed of the movement of the mobile device. The process then uses that information to interpolate or extrapolate the location of the mobile device. In some embodiments, the process identifies the location of the mobile device by a circle and as the content becomes older, the radius of a circle becomes larger.

When content is not allowed to include the requested information, the process uses (at 1035) indirect methods such as IP address, address stored in a profile database, last known address/orientation, interpolation/extrapolation based on previous user location history to determine the mobile device's location or other requested information and sends the information to the requesting party. The process then ends.

One of ordinary skill in the art will recognize that process 900 is a conceptual representation of the operations that are performed in some embodiments. The specific operations of process 900 may not be performed in the exact order shown and described. The specific operations may not be performed in one continuous series of operations, and different specific operations may be performed in different embodiments. Furthermore, the process could be implemented using several sub-processes, or as part of a larger macro process.

II. Examples of the Use of Geotagging to Determine User Location and Provide Location-Based Advertising Several embodiments that use geotagging and timestamping to determine user location and provide location-based advertising are described in the following sub-sections.

A. Social Networking Site

Figure 11:
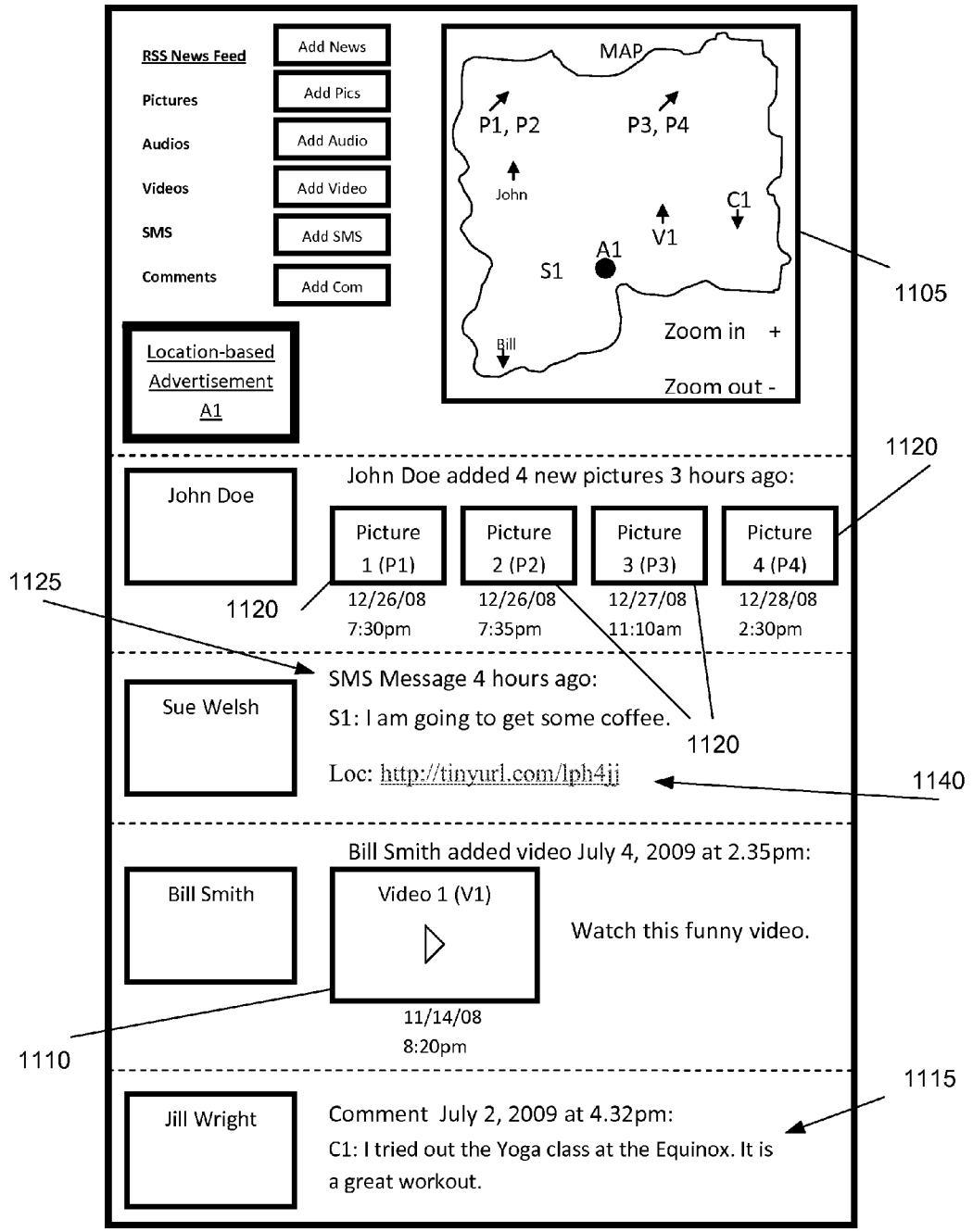
FIG. 11 conceptually illustrates an example interface of some embodiments for a user that uses a mobile device to connect to a networked server and access some of the information in the databases.

FIG. 11 conceptually illustrates an example interface of some embodiments for a user called "Sue Welsh" that uses a mobile device in FIG. 5 to connect to the networked server of FIG. 5 and access some of the information in the databases in FIG. 5. In this example the location-based application on the server 520 in FIG. 5 provides a communication web site for social networking (e.g. Facebook®, MySpace™, YouTube®, Twitter™ and LinkedIn®). The user sees really simple syndication (RSS) news, pictures, audios, videos, SMS, and comments from her chosen circle of friends. Three such friends are shown in FIG. 11; "John Doe", "Bill Smith" and "Jill Wright". Sue sees the latest 4 pictures (1120) that were uploaded by John Doe. The date and time when each picture is taken (and time-stamped) is shown next to the picture. These are different from the date and time when the pictures are uploaded to the web site. This is one of the benefits of including the creation date and time information with the content.

The tagged location of each picture (P1, P2, P3 and P4) is also displayed on a map 1105, with the arrows showing the compass direction (a 3D map can also display the tilt). In some embodiments, the map also shows the creation time of the content. Sue and her friends see an SMS message from Sue. The message also has a small URL 1140 at the end of the message that indicates her location/orientation when she sent the message. That location and compass orientation is also shown on the map (S1). In some embodiments, the location URL uses URL parameters to distinguish location parameters, angle and tilt. A URL parameter begins with a question mark (?) and takes the form of a name/value pair that is appended to the URL. If more than one URL parameter exists, each parameter is separated by an ampersand (&). In some embodiments the application server uses a special reserved identifier (The string "Loc:" in this example) to differentiate the user's location URL from other URLs that may be embedded in the message. Bill Smith has also added a video (1110) with a comment. The creation time of the video is shown below it. Again this is different from the upload date and time that is also shown. Also shown on the map are the tagged location and orientation of the mobile whilst taking the video (V1). Jill Wright has also added a comment 1115. Her location and orientation when she entered the comment is also shown on the map (C1). The user interface may also display the location range of the user with a circle, where the radius is proportional to the difference between current time and the content's timestamp.

As shown in FIG. 6, the location server uses a number of methods to determine the location of the user. These include position tracking, metadata of user's tagged content, user location history, user profile and user's IP address. The application server in FIG. 5 also has an associated ad server that provides location-based contextual advertisements to the client that is viewing a page. In FIG. 11 both Bill and John have set their mobile's security preference settings such that their mobile's position is regularly transmitted to the location server of the social networking service. Jill and Sue, however, have disabled that feature but enabled content tagging. Some of the security preferences are specific to certain applications/web services and are stored in the user profile database of the application server. For example, Bill and John can specify which friends should be able to see their locations on the social networking site, and those settings are stored in the user profile database in FIG. 5. In this example they have allowed Sue to see their locations. Hence, their most up-to-date locations, as well as their latest content locations, are marked on the map that Sue sees. There could also be additional controls that allows them to hide their locations at specified times and dates.

The following is a location-based contextual ad example. Suppose that when Sue Welsh logs in with her mobile to the social networking site her location is, "1500 Ocean Ave, 90401-2119, Santa Monica, Calif., USA". After logging in she posts the SMS message 1125 "I am going to get some coffee" to her friends on the social networking site. Her mobile's security preferences allow geotagging the position/orientation of her content and her user profile on the social networking site allows all her friends to see the tagged information. The application server indexes Sue's message and sends the keywords "Coffee" and "Shop" to the ad server. The location server also obtains Sue's Santa Monica location from the geotagged SMS message (extracts longitude and latitude information and uses the map database to convert them to street coordinates). The accuracy of this tagged location is high since the timestamp on the SMS message is close to current time. The ad server then searches the ad database for "Coffee", "Shop" and "Santa Monica", finds several results and uses the map database to calculate the closest coffee shop to Sue's location. The ad server then finds the ad for the closest coffee shop: "You are invited to free pastries at Famous Coffee Shop at 900 Ocean Ave, Santa Monica, Calif.". This ad and the location associated with the shop are sent to the application server.

The application server then personalizes the ad message by adding Sue's name: "Dear Sue, You are invited to free pastries at Famous Coffee Shop at 900 Ocean Ave, Santa Monica, Calif.". The application server sends the location of the coffee shop to the map server. The location of the recommended coffee shop is then added to the map (A1). Similarly, the ad server would serve different location-based ads to Sue's friends ("John Doe", "Bill Smith" and "Jill Wright") based on each of their locations, their contexts, and user profile database entries. This ad example illustrates the placement of an ad directly on the social networking site of a user based on the user's location and the context of her message. Other ads could be recommended based on the data mining server's analyzing of the demographic, behavior and location of the user's circle of friends. The ad server can also send additional information to the application server for formatting and display such that the advertiser's ad has links for directions, telephone calling, user ratings, advertiser's web site and advertiser's coupons (e.g. see FIG. 15 below).

B. Email

In some embodiments, the application server in FIG. 5 is an email server that supports an advanced email protocol (such as Internet Mail Access Protocol (IMAP)) where the email stays on the server. Then the content database 570 in FIG. 5 includes text emails as well as email attachments. In some embodiments, the mobile devices use a browser or an email client to communicate with the email application server. In one configuration users who are sending each other email are using the same email service (e.g. Yahoo!® Mail) and so they are using the same application server and their email contents are stored in the same logical databases. In another configuration, the users are using different services (e.g. Yahoo!® Mail and Gmail™). In this configuration when a Yahoo® email account user sends an email to a Gmail™ account both Yahoo® and Gmail™ servers keep a copy of the email in their databases. So while the application/ad servers for the two users are different systems, their shared emails with context and geotagging information are accessible to both systems. Also note that a single email that has one attachment can include two sets of position/orientation/timestamp information; one for where/when the email is sent and one for where/when the attachment was created.

Figure 12:
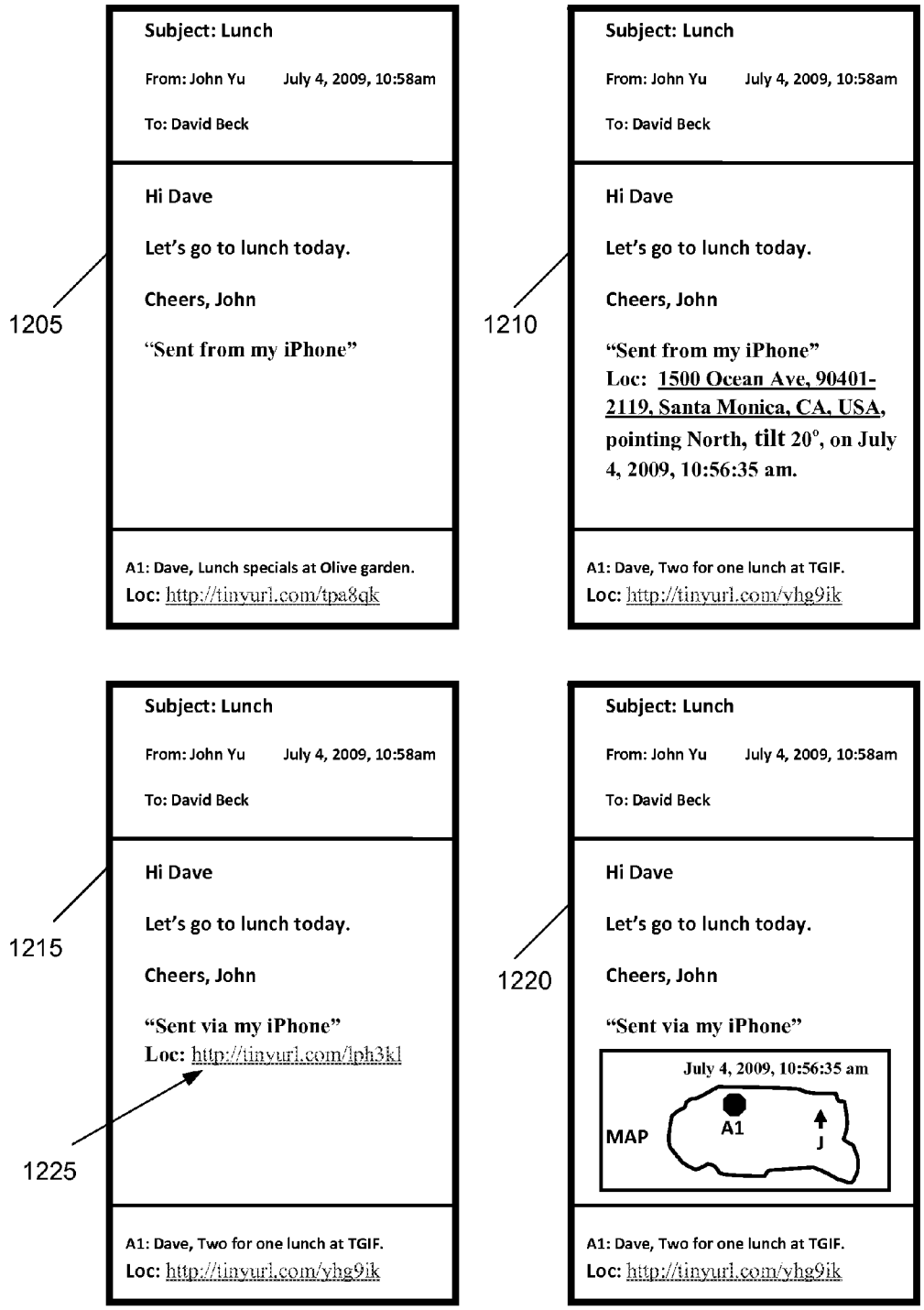
FIGS. 12 and 13 conceptually illustrate examples of location-based advertising for email in some embodiments.
Figure 13:
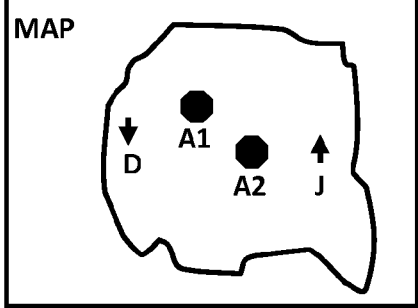

FIGS. 12 and 13 conceptually illustrate examples of location-based advertising for email in some embodiments, where the sender's position/orientation is shown in the sender's email signature and the ad targeting the recipient is shown at the bottom of the email. In this kind of collaborative scenario there are at least three options for choosing the address to target the ads to: 1—Target the email sender's locations; 2—Target the email recipients' locations; and 3—Target all or a subset of all the locations (sender's and the recipients'). In this example the email application server determines that this is collaboration so it targets the ads to both locations if they are known. As shown "Dave" receives (at 1205) an email from "John Yu" about a lunch meeting, but the email is not geotagged and does not provide location information about the sender. The location server uses one of the other methods (other than using geotags) to find the recipient's location (user location history, user profile, IP address). However, these methods are typically less accurate and are at the scale of the zip code. The email application server indexes the email, determines context with keywords such as "lunch" that appear inside the email, and uses an ad server to make a restaurant recommendation to Dave. There could also be a list of restaurant ads for Dave at the bottom of the email. Since there is no location information about the sender the received email has a default signature: "Sent via my mobile phone".

Such signatures are often static and are stored in a file. One option for geotagging email is for either the client or the email application server to embed the GPS Coordinates, the compass orientation and tilt degree, and the client's timestamp in the email signature: "Sent via my Mobile Phone" Loc: GPS Latitude, Longitude Coordinates: 34.012693, −118.496485, pointing North, tilt 20o, on Jul. 4, 2009, 10:56:35 am."

The examples of FIGS. 12 and 13 use the "GPS decimal notation with negative numbers for South and West". There are different notations that could be used that are equivalent such as "Degrees and decimal minutes with N, S, E or W suffix for North, South, East, West" or "Degrees, minutes and decimal seconds with N, S, E or W suffix for North, South, East, West".

In these examples, the location module in FIG. 2 provides the GPS coordinates to the email client program, the magnetometer provides the orientation, and the date/time module provides the date and time. The email client program then adds the position, orientation, and date/time stamps to the signature file. If a browser is used then a software component such as a plug-in or Active X component needs to be installed that can perform similar tasks for the signature file. Other embodiments do email geotagging by sending the position/orientation/time-stamp information as an attachment with a special reserved name identifier that the email server knows about and recognizes, and then the email server modifies the signature or adds this information somewhere in the email body. If html email and dynamic images are supported then the emails can be presented in html with dynamic images for locations and maps. If, however, this is not the case then the emails can include URL links that point to dynamic maps and/or include static images of the maps as attachments.

FIG. 12 also shows examples when the sender, "John", adds his position/orientation/time-stamp information to the email signature and it is displayed using different presentation methods. For instance, FIG. 12 shows (at 1210) an example of textual representation of this information. FIG. 12 also shows (at 1215) an example of a short alias URL for a longer URL that points to a server, where the URL has name/value pairs that the server extracts for position, orientation and time/date. The user then clicks on the short URL to see a graphical presentation of position/orientation and date/time. FIG. 12 also shows (at 1220) an example of an embedded map display that is similar to what would be displayed if the URL in the signature 1225 is clicked. This translation and formatting of the user's location/orientation and timestamp are done by the email system's location server, the email application server, and the corresponding map server 550, as shown in FIG. 5. The examples shown at 1210-1220 show a different ad compared to the example shown at 1205 since in the examples 1210-1220 the sender has provided his location through the email signature and the ad can be targeted to the location of both the sender and the receiver. In the example shown at 1220 the location of the receiver ("Dave") is not shown on the map since he has not yet provided a tagged email response and the email system only knows a coarse position for him such as a zip code.

FIG. 13 conceptually illustrates the example 1305 when the recipient "Dave" replies to the sender "John" and there are two signatures with location information. In the Examples of FIG. 12 the ad text is personalized for the recipient "Dave". In FIG. 13 the ad text is personalized to "John", since he is the recipient of the reply. In FIG. 13 the email application server determines that this is collaboration so it uses the location server to extract both locations from the two signatures with the string identifier "Loc:" It then sends both locations (or a single aggregate location) and information to the ad server. The ad server then recommends ads that are close to both their locations. The map server also generates a map 1310 with the locations of both users and all the ads.

The location URL can use URL parameters to distinguish location geocode parameters, angle, tilt, date and time. A URL parameter begins with a question mark (?) and takes the form of a name/value pair that is appended to the URL. If more than one URL parameter exists, each parameter is separated by an ampersand (&). The email system and its location server can use a special identifier (The string "Loc:" in this example) to differentiate the user's location URL from other URLs that may be embedded in the message. For example the following URL has embedded the GPS coordinates of the address in the example shown at 1210 into a URL that points to a Google map server:
http://maps.google.com/
maps?f=q&source=s_q&hl=en&geocode=&q=1500+
Ocean+Ave,+santa+monica&sll=34.014001,-
118.496475&sspn=0.008253,
0.01929&ie=UTF8&ll=34.01441,-
118.496475&spn=0.008253,0.01929&z=16&iwloc=A Some embodiments parse the orientation and tilt information and use them to display the orientation on a 2D or 3D map. There are URL link shortener services such as www.Tinyurl.com® that take the above long URL and create a shorter alias that redirects to the original long URL. The example shown at 1215 illustrates the result of this approach. The following is an example of the steps that some embodiments take to implement examples of FIGS. 12 and 13.

When a user sends an email the mobile's email client embeds parameters for GPS latitude, longitude, magnetometer direction, magnetometer tilt, date and time into the email signature with a specified format that is preceded with a reserved identifier string such as "Loc:". Alternatively, some embodiments send the tagging parameters as an attachment in a specified file name to the email application server and let the server modify the signature file. The email application server receives the email.

Next, the email recipient logs into the email application server and requests to see the tagged email in her inbox. The email application server then downloads the requested email; its location server parses the signature to look for the string identifier (e.g. "Loc"), extracts the geotagged parameters, and sends the location parameters to the application server. (If the tagging parameters are sent as an attachment then the location server downloads the attachment, extracts the parameters and sends them to the application server). (4) The email application server uses a map database and a link shortener to generate a short URL for the position of the sender and modifies the sender's signature with this URL.

The email application server then indexes the email's text to define context and sends the context and the recipient's information to the ad server. The email application server also determines if the email is collaborative. If the signatures of the other users are included in the replies in the threaded email then the application server can extract their positions too. Otherwise, it asks the location server to find the position of the other users from other means such as location history, user profile, or location tracking. Then the application server finds the aggregate location of all users and passes that information and the users' information to the ad server.

Next, the ad server uses the context and the location to find location-based contextual ads and passes the ad information to the email application server. Next, the email application server formats the ads for display at the client. For a display like the Example shown at 1215 the email server can personalize the text of the ads for the user. In some embodiments, the email server also uses a map server to generate a map and a link shortener to insert a short URL pointer for the map in the ad. For a display like the example shown at 1220, the dynamic map is inserted in the email, provided html email is supported. The map can replace the sender's signature as shown, or it can replace the ad's link, or it can replace both. The example shown in FIG. 13 is similar except that the location of more than one user (or an aggregate location) is passed to the ad server and the map server.

When an email thread is send to multiple recipients, personalization of the text of the ad (i.e. showing the name of each recipient before the ad) is more involved. Some embodiments do not personalize the text so all the recipients see the same text. Alternatively, some embodiments, for web-based email systems send a URL for the ad and that URL includes a parameter for the User ID, so that when the recipients click on the link they would see different personalized texts with the names that are associated with their User IDs.

Figure 14:
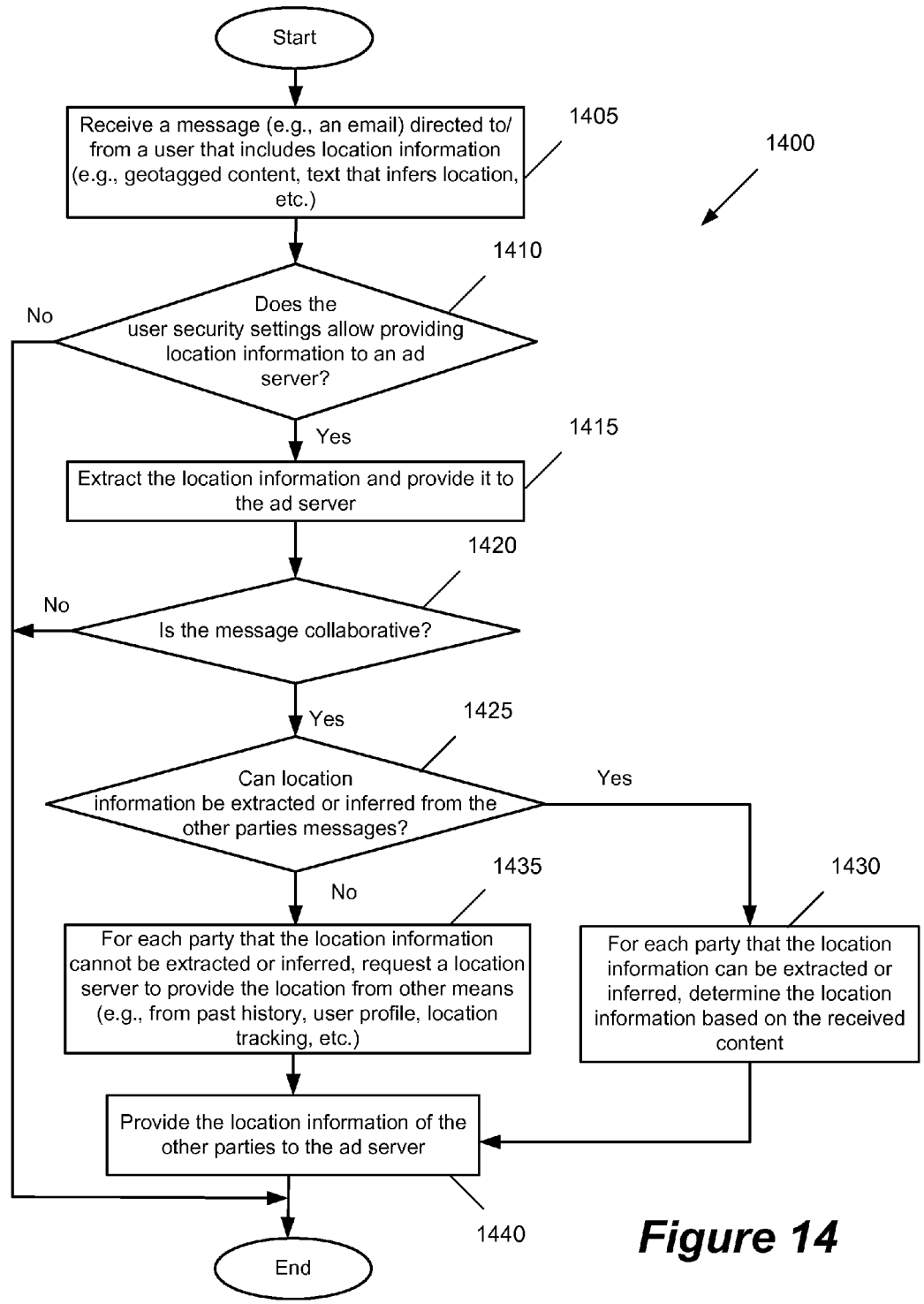
FIG. 14 conceptually illustrates a process performed by one or more servers to provide location-based advertisement in some embodiments.

FIG. 14 conceptually illustrates a process 1400 performed by one or more servers (e.g. an email server 520) to provide location-based information to an ad server in some embodiments. As shown, the process receives (at 1405) a message (e.g., an email) that includes information such as geotagged content, text that infers location, etc. The process determines (at 1410) whether the security settings of the user's mobile device allow providing location information to an ad server. In some embodiments, this security information is accompanied as metadata with the content. In other embodiments, this information is retrieved from a database such as user profile database 525. When the security settings do not allow providing location information to the ad server, the process ends. Otherwise, the process extracts (at 1415) the location and/or time information from the content and provides it to the requesting party (e.g., the ad server). In some embodiments, the location information is extracted by using a location server.

Next, the process determines (at 1420) whether content is part of a collaborative message. When the content is not part of a collaborative message, the process ends. Otherwise, the process determines (at 1425) whether location information can be extracted or inferred from the other parties' messages. When such location information can be extracted or inferred for some or all of the parties to the collaborative message, the process determines (at 1430) those parties' location information based on the received content. The process then provides (at 1440) the location information of the other parties to the ad server. The process then ends.

When location information cannot be extracted or inferred from some or all other parties, the process requests (at 1435) a location server to provide the location information from other means (e.g., from past history, user profile, location tracking, etc.) for those parties. The process then proceeds to 1440 which is described above.

Some embodiments consider the time an email was sent in order to determine the reliability of using the email for location determination. Other embodiments use the context of the email to determine a time period for which the email is to be used for location determination.

One of ordinary skill in the art will recognize that process 1400 is a conceptual representation of the operations that are performed in some embodiments. The specific operations of process 1400 may not be performed in the exact order shown and described. The specific operations may not be performed in one continuous series of operations, and different specific operations may be performed in different embodiments. Furthermore, the process could be implemented using several sub-processes, or as part of a larger macro process.

C. SMS

A popular form of social networking is to send SMS text messages to a list of contacts and to receive short messages from possibly another list of contacts. Twitter™ is one such example, where users can send and receive short messages, called tweets, via the Twitter™ web site, SMS or external applications. It is possible to use the location of the user as specified in her profile as the originating location of the message and show that on a map. But this is not accurate since profiles are usually specified at the city level. They are also static files and mobile users do not change them as they move around. SMS has limitations on the number of characters that can be sent. If the message extends beyond the limit it is truncated. Thus, it is better to use the small URL alias method for including position information in the SMS text message (e.g. In our Santa Monica address example one should use http://tinyurl.com/lph3kl instead of the original long map URL, street address, or the GPS coordinates since it is the shortest representation). If orientation and client-side timestamping are also to be carried out they have to be shortened with aliasing or hashing methods because of the number of characters limitation. This shortening step was carried out on the server-side for email, but for SMS it has to be carried out on the client-side because of the limitations on the number of characters.

Figure 15:
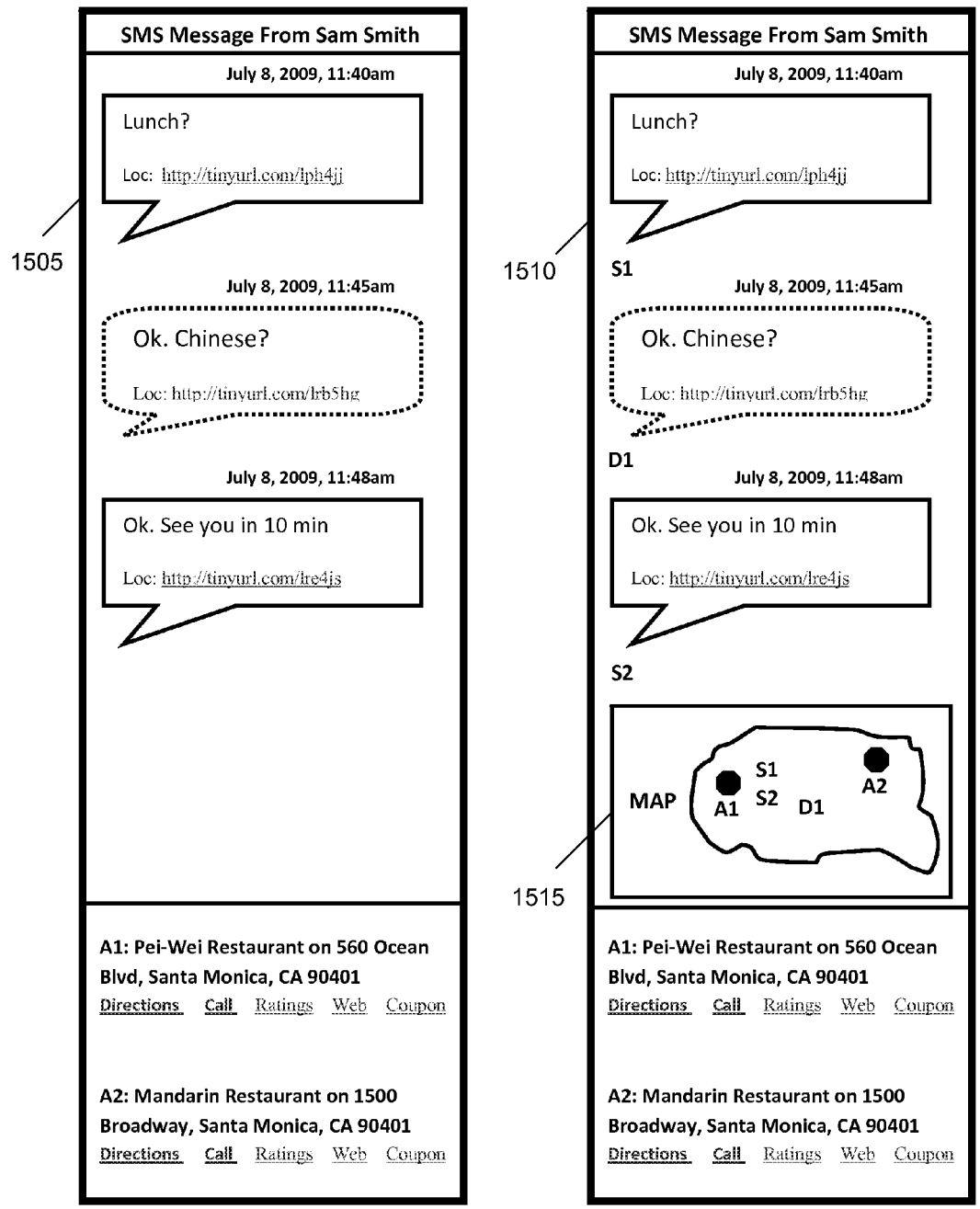
FIG. 15 conceptually illustrates examples of location-based SMS messages and location-based advertising with links to directions, VoIP calling, user ratings, advertiser's web site, and advertiser's coupons in some embodiments.

FIG. 15 conceptually illustrates examples of location-based SMS messages and location-based advertising with links to directions, VoIP calling, user ratings, advertiser's web site, and advertiser's coupons in some embodiments. The example of FIG. 15 shows (at 1505) an SMS conversation between two mobile cell phone users, Sam Smith and Dave. When Sam presses send for his first SMS message on the screen the mobile device's location module first makes a separate request to a server and its link shortener to convert the GPS coordinates to a short URL, where the URL is the equivalent map pointer. The location module then receives the short URL and passes it onto the mobile device's client SMS program which in turn adds it to the SMS message. Likewise, when Dave replies his mobile's location module adds his location's short URL to the SMS message. The location-based SMS application server indexes the SMS content of the messages and recognizes the keywords "restaurant" and "Chinese". The SMS application server sends these context keywords to the location-based contextual ad server. The application server determines that this is a collaborative task between two users. Since both users have provided their locations to the SMS server the server can send both their locations (or one aggregate location) to the ad server. The ad server can then send recommend Chinese restaurants that are close to both their locations.

The SMS application server receives these recommendation and formats them for display. In this example, two restaurant are recommended (A1 and A2), where the closer restaurant (A1) is shown first in the ad list. The SMS application server formats the ads and provides individualized driving directions to the restaurants for each of the two users since it knows both their locations. The SMS application server also provided links to the advertisers' web sites and coupons, as well as a "call" link that includes the advertisers' telephone number and points to a Voice over Internet Protocol (VoIP) server so that when it is clicked it will invoke an application (e.g. Skype) and make the call. The application server also provides a URL link that uses a rating server on the Internet that provides ratings on the recommended restaurants. If the two users go to one of the recommended restaurants they could also use this link to provide their ratings.

FIG. 15 also shows (at 1510) that the map server has generated a map 1515 that shows the position of the two mobiles at the time of transmitting the SMS messages, and the location of the ad server's recommended restaurant. This image is transmitted to the client with Multimedia Messaging Service (MMS) since SMS does not support images. Note that some VoIP systems (e.g. Skype's peer-to-peer method) allow text messaging between users. Thus, another application for the system is that VoIP users can send messages to each other as in FIG. 15, and receive location-based contextual advertising. The display of FIG. 15 is only one example user interface for viewing SMS messages. Some embodiments display SMS messages in a format that is more similar to email, as shown in FIG. 12. Likewise, some embodiments display the emails of FIG. 12 in a format that resembles FIG. 15.

D. Weblog

Weblogs or blogs are web commentaries. Personal blogs are ongoing commentary by an individual. Some social networking sites allow users to share comments. Really Simple Syndication (RSS) is also a popular web feed format to publish web documents that are frequently updated such as blog entries, news, audio and video. Geotag information can be included as a short URL in the web comments, or included in a metadata file, which is typically in XML format. Readers of the blogs can then find out the location of the author when the blog entry is made. Readers can also place their comments on blogs/newsgroups, where their tagged location information is also included.

E. Image/Video

When the mobile device's camera takes a picture or is finished taking a video the date and time module notes the date/time, the magnetometer sensor determines the orientation, and the location module calculates the coordinates of the mobile device. If for any reason there are no wireless signals that can locate the mobile device, the last known position of the device can be used. Different embodiments store this information in different ways. Some embodiments geocode the image/video by storing the position and orientation information in special binary fields of the image header, which is later read by image reader programs.

Some embodiments add the orientation, longitude and latitude information to a metadata file that is associated with the image/video such as the Exchangeable Image File Format (EXIF). Some embodiments, rename the image/video where the name of the file includes identifiers and values for the orientation, latitude, longitude, date and time.

Some embodiments physically stamp the information onto the image/video so that it is visible to the human eye at the bottom or top of the image/video. This option is more difficult for a server to process and extract the information. Geotagged images/videos can then easily be uploaded to online content albums and organized/labeled.

III. Computer System

Many of the above-described processes and modules are implemented as software processes that are specified as a set of instructions recorded on a computer readable storage medium (also referred to as "computer readable medium" or "machine readable medium"). These instructions are executed by one or more computational elements, such as one or more processing units of one or more processors or other computational elements like Application-Specific ICs ("ASIC") and Field Programmable Gate Arrays ("FPGA"). The execution of these instructions causes the set of computational elements to perform the actions indicated in the instructions. Computer is meant in its broadest sense, and can include any electronic device with a processor (e.g., moving scanner, mobile device, access point, etc.). Examples of computer readable media include, but are not limited to, CD-ROMs, flash drives, RAM chips, hard drives, EPROMs, etc. The computer readable media does not include carrier waves and/or electronic signals passing wirelessly or over wired connection.

In this specification, the term "software" includes firmware residing in read-only memory or applications stored in magnetic storage that can be read into memory for processing by one or more processors. Also, in some embodiments, multiple software inventions can be implemented as parts of a larger program while remaining distinct software inventions. In some embodiments, multiple software inventions can also be implemented as separate programs. Finally, any combination of separate programs that together implement a software invention described herein is within the scope of the invention. In some embodiments, the software programs when installed to operate on one or more computer systems define one or more specific machine implementations that execute and perform the operations of the software programs.

Figure 16:
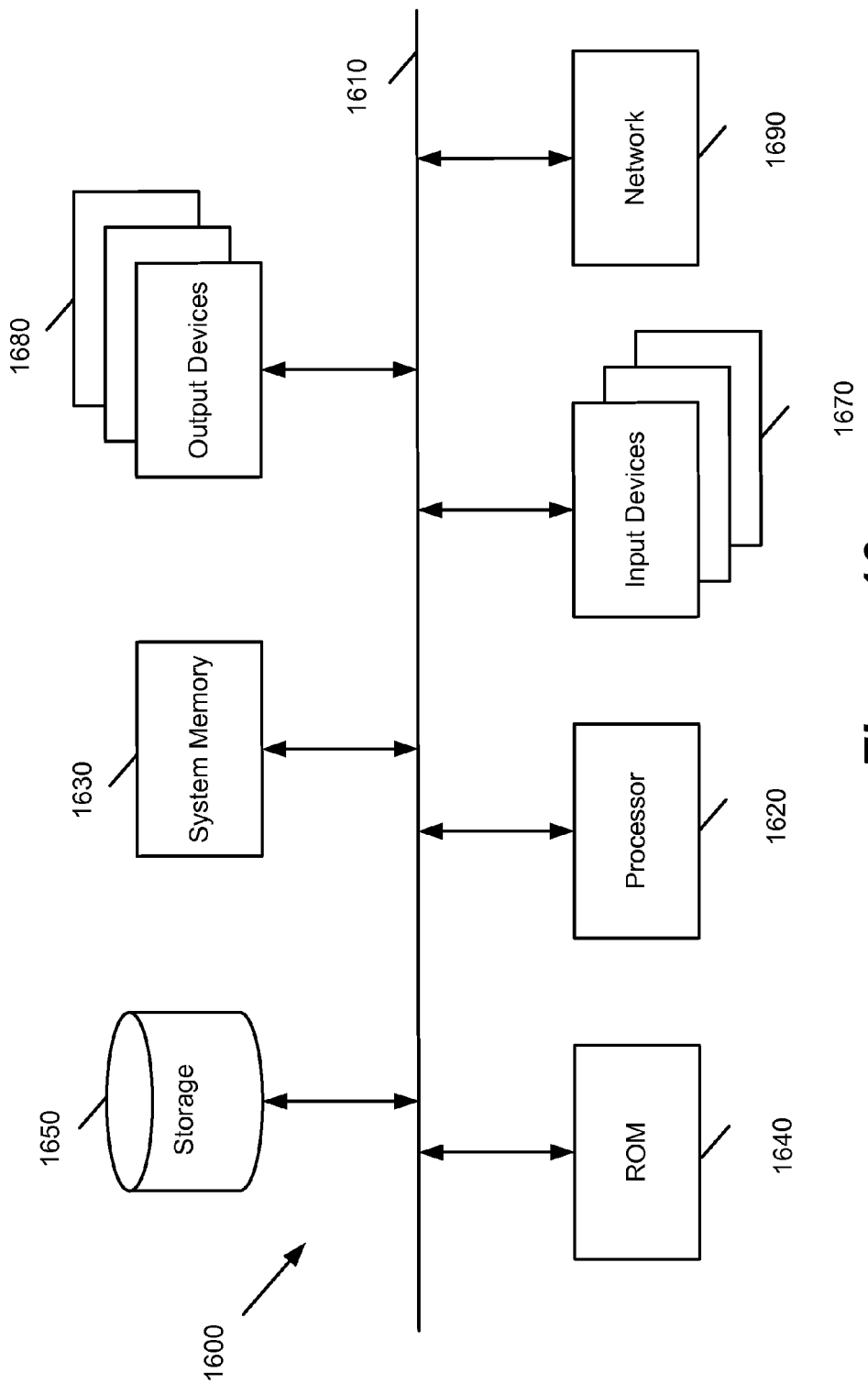
FIG. 16 conceptually illustrates a computer system with which some embodiments of the invention are implemented.

FIG. 16 conceptually illustrates a computer system 1600 with which some embodiments of the invention are implemented. For example, the mobile device described above by reference to FIGS. 1, 2, and 5 and the servers described above by reference to FIG. 5 may be at least partially implemented using sets of instructions that are run on the computer system 1600. As another example, the processes described by reference to FIGS. 3, 6, 7, 8, 9, 10, 14 may be at least partially implemented using sets of instructions that are run on the computer system 1600.

Such a computer system includes various types of computer readable mediums and interfaces for various other types of computer readable mediums. Computer system 1600 includes a bus 1610, at least one processing unit (e.g., a processor) 1620, a system memory 1630, a read-only memory (ROM) 1640, a permanent storage device 1650, input devices 1670, output devices 1680, and a network connection 1690. The components of the computer system 1600 are electronic devices that automatically perform operations based on digital and/or analog input signals. The various examples of user inputs described above may be at least partially implemented using sets of instructions that are run on the computer system 1600 and displayed using the output devices 1680.

One of ordinary skill in the art will recognize that the computer system 1600 may be embodied in other specific forms without deviating from the spirit of the invention. For instance, the computer system may be implemented using various specific devices either alone or in combination. For example, a local Personal Computer (PC) may include the input devices 1670 and output devices 1680, while a remote PC may include the other devices 1610-1650, with the local PC connected to the remote PC through a network that the local PC accesses through its network connection 1690 (where the remote PC is also connected to the network through a network connection).

The bus 1610 collectively represents all system, peripheral, and chipset buses that communicatively connect the numerous internal devices of the computer system 1600. In some cases, the bus 1610 may include wireless and/or optical communication pathways in addition to or in place of wired connections. For example, the input devices 1670 and/or output devices 1680 may be coupled to the system 1600 using a wireless local area network (W-LAN) connection, Bluetooth®, or some other wireless connection protocol or system.

The bus 1610 communicatively connects, for example, the processor 1620 with the system memory 1630, the ROM 1640, and the permanent storage device 1650. From these various memory units, the processor 1620 retrieves instructions to execute and data to process in order to execute the processes of some embodiments. In some embodiments the processor includes an FPGA, an ASIC, or various other electronic components for execution instructions.

The ROM 1640 stores static data and instructions that are needed by the processor 1620 and other modules of the computer system. The permanent storage device 1650, on the other hand, is a read-and-write memory device. This device is a non-volatile memory unit that stores instructions and data even when the computer system 1600 is off. Some embodiments of the invention use a mass-storage device (such as a magnetic or optical disk and its corresponding disk drive) as the permanent storage device 1650.

Other embodiments use a removable storage device (such as a floppy disk, flash drive, or CD-ROM) as the permanent storage device. Like the permanent storage device 1650, the system memory 1630 is a read-and-write memory device. However, unlike storage device 1650, the system memory 1630 is a volatile read-and-write memory, such as a random access memory (RAM). The system memory stores some of the instructions and data that the processor needs at runtime. In some embodiments, the sets of instructions and/or data used to implement the invention's processes are stored in the system memory 1630, the permanent storage device 1650, and/or the read-only memory 1640. For example, the various memory units include instructions for processing multimedia items in accordance with some embodiments.

The bus 1610 also connects to the input devices 1670 and output devices 1680. The input devices 1670 enable the user to communicate information and select commands to the computer system. The input devices include alphanumeric keyboards and pointing devices (also called "cursor control devices"). The input devices also include audio input devices (e.g., microphones, MIDI musical instruments, etc.) and video input devices (e.g., video cameras, still cameras, optical scanning devices, etc.). The output devices 1680 include printers, electronic display devices that display still or moving images, and electronic audio devices that play audio generated by the computer system. For instance, these display devices may display a graphical user interface (GUI). The display devices include devices such as cathode ray tubes ("CRT"), liquid crystal displays ("LCD"), plasma display panels ("PDP"), surface-conduction electron-emitter displays (alternatively referred to as a "surface electron display" or "SED"), etc. The audio devices include a PC's sound card and speakers, a speaker on a cellular phone, a Bluetooth® earpiece, etc. Some or all of these output devices may be wirelessly or optically connected to the computer system.

Finally, as shown in FIG. 16, bus 1610 also couples computer 1600 to a network 1690 through a network adapter (not shown). In this manner, the computer can be a part of a network of computers (such as a local area network ("LAN"), a wide area network ("WAN"), an Intranet, or a network of networks, such as the Internet. For example, the computer 1600 may be coupled to a web server (network 1690) so that a web browser executing on the computer 1600 can interact with the web server as a user interacts with a GUI that operates in the web browser.

As mentioned above, some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by a device such as an electronics device, a microprocessor, a processor, a multi-processor (e.g., an IC with several processing units on it) and includes sets of instructions for performing various operations. The computer program excludes any wireless signals, wired download signals, and/or any other ephemeral signals.

Examples of hardware devices configured to store and execute sets of instructions include, but are not limited to, ASICs, FPGAs, programmable logic devices ("PLDs"), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "computer system", "server", "processor", and "memory" all refer to electronic or other technological devices. These terms exclude people or groups of people. For the purposes of this specification, the terms display or displaying mean displaying on an electronic device. As used in this specification and any claims of this application, the terms "computer readable medium", "computer readable media", "machine readable medium", and "machine readable media" are entirely restricted to non-transitory, tangible, physical objects that store information in a form that is readable by a computer. These terms exclude any wireless signals, wired download signals, and/or any other ephemeral signals.

It should be recognized by one of ordinary skill in the art that any or all of the components of computer system 1600 may be used in conjunction with the invention. Moreover, one of ordinary skill in the art will appreciate that any other system configuration may also be used in conjunction with the invention or components of the invention.

While the invention has been described with reference to numerous specific details, one of ordinary skill in the art will recognize that the invention can be embodied in other specific forms without departing from the spirit of the invention. Moreover, while the examples shown illustrate many individual modules as separate blocks, one of ordinary skill in the art would recognize that some embodiments may combine these modules into a single functional block or element. One of ordinary skill in the art would also recognize that some embodiments may divide a particular module into multiple modules. Furthermore, specific details (such as details shown in FIGS. 4, 6, 17, 19, etc.) are given as an example and it is possible to use different circuit implementations to achieve the same results without deviating from the teachings of the invention.

One of ordinary skill in the art would understand that the invention is not to be limited by the foregoing illustrative details, but rather is to be defined by the appended claims.

What is claimed is:

1. A method of receiving location-based information at a mobile device from a set of one or more servers, the method comprising:
    disabling location reporting from the mobile device to said set of servers in response to receiving, by the mobile device, a user selection to disable location reporting from the mobile device to the set of servers, disabling location reporting from the mobile device comprising disabling broadcasting of the location of the mobile device to the set of servers;
    activating geotagging of at least a portion of content generated at the mobile device in response to receiving, by the mobile device, a user selection to activate geotagging of at least a portion of content generated at the mobile device;
    activating time-stamping of at least a portion of the content generated at the mobile device in response to receiving, by the mobile device, a user selection to activate time-stamping of at least a portion of the content generated at the mobile device;
    generating content at the mobile device;
    geotagging and time-stamping, by the mobile device, at least a portion of the generated content;
    sending the generated content and the associated geotag and time-stamp from the mobile device to the set of servers; and
    sending location-based information from the set of servers to the mobile device based on a location of the mobile device indirectly derived by the set of servers from the geotag and the time-stamp of the content sent by the mobile device to the set of servers while location reporting from the mobile device to said set of servers is disabled.

2. The method of claim 1, wherein said content sent from the mobile device to the set of servers comprises a context, the method further comprising:
    generating location-based contextual information at the set of servers based on the context of said content sent from the mobile device to the set of servers;
    sending said location-based contextual information from the set of servers to the mobile device; and
    receiving said location-based contextual information at the mobile device from the set of servers.

3. The method of claim 1, wherein geotagging the content comprises selectively geotagging a portion of the content based on said received user selection for activating geotagging at least a portion of the content generated at the mobile device.

4. The method of claim 1, wherein geotagging the content comprises geotagging a coarse location for the content based on a set of security privacy settings.

5. The method of claim 1, wherein the location-based information sent from the set of servers to the mobile device is associated with a service provider, the method further comprising:
    sending a telephone link of the service provider associated with the location-based information from the set of servers to the mobile device; and
    receiving the telephone link of the service provider associated with the location-based information at the mobile device from the set of servers.

6. The method of claim 5, wherein the telephone link is a link to a Voice over Internet Protocol (VoIP) server to make a call.

7. The method of claim 1 further comprising displaying a map associated with the location-based information on the mobile device.

8. The method of claim 1, wherein activating geotagging of at least a portion of the content comprises activating geotagging of a first set of content types, the method further comprising:
    by the mobile device, receiving a user selection for deactivating geotagging of a second set of content types, wherein geotagging said at least a portion of the content comprises geotagging content types in the first set of content types.

9. The method of claim 8, wherein content types generated at the mobile device comprise one or more of pictures, audios, videos, and text.

10. The method of claim 1 further comprising activating geotagging for content generated by a first set of applications and deactivating geotagging for content generated by a second set of applications, wherein geotagging said at least a portion of the content comprises geotagging content generated by the applications in the first set of applications.

11. The method of claim 1, wherein activating time-stamping of at least a portion of the content comprises activating time-stamping of a first set of content types, the method further comprising:
    deactivating time-stamping of a second set of content types by the mobile device in response to receiving a user selection for deactivating time-stamping of the second set of content types, wherein time-stamping at least a portion of the content comprises time-stamping content types in the first set of content types.

12. The method of claim 1 further comprising:
    activating time-stamping for content generated by a first set of applications and deactivating time-stamping for content generated by a second set of applications; and
    time-stamping, by the mobile device, at least a portion of the content,
    wherein sending the content from the mobile device to the set of servers further comprises sending the time-stamp associated with the content from the mobile device to the set of server,
    wherein receiving location-based information at the mobile device comprises receiving location-based information at the mobile device from the set of servers based on a location of the mobile device derived from the time-stamp received by the set of servers from the mobile device.

13. The method of claim 1, wherein geotagging at least a portion of the generated content comprises geotagging the portion of the generated content with an orientation of the mobile device in three dimensions.

14. The method of claim 1, wherein an accuracy of said indirectly determined location of the mobile device by the set of servers decreases with increasing of an elapsed time since location reporting is disabled at the mobile device.

15. The method of claim 1, wherein disabling location reporting from the mobile device comprises disabling live tracking of the location of the mobile device.

16. A system comprising:
a mobile device; and
a set of servers;
the mobile device configured to:
- disable location reporting from the mobile device to said set of servers in response to receiving a user selection to disable location reporting from the mobile device to the set of servers, disabling location reporting from the mobile device comprising disabling broadcasting of the location of the mobile device to the set of servers;
- activate geotagging of at least a portion of content generated at the mobile device in response to receiving a user selection to activate geotagging of at least a portion of content generated at the mobile device;
- activate time-stamping of at least a portion of the content generated at the mobile device in response to receiving a user selection to activate time-stamping of at least a portion of the content generated at the mobile device;
- generate content at the mobile device;
- geotag and time-stamp at least a portion of the generated content; and
- send the generated content and the associated geotag and time-stamp to the set of servers;

the set of servers configured to:
- send location-based information to the mobile device based on a location of the mobile device indirectly derived by the set of servers from the geotag and the time-stamp of the content sent by the mobile device to the set of servers while location reporting from the mobile device to said set of servers is disabled.

17. The system of claim 16, wherein said content sent from the mobile device to the set of servers comprises a context, the set of servers further configured to:
- generate location-based contextual information based on the context of said content sent from the mobile device to the set of servers;
- send said location-based contextual information to the mobile device; and
- the mobile device further configured to receive said location-based contextual information from the set of servers.

18. The system of claim 16, wherein geotagging content comprises selectively geotagging a portion of the content based on said user selection for activating geotagging at least a portion of the content generated at the mobile device.

19. The system of claim 16, wherein geotagging the content comprises geotagging a coarse location for the content based on a set of security privacy settings.

20. The system of claim 16, wherein the location-based information sent from the set of servers to the mobile device is associated with a service provider,
- the set of servers further configured to send a telephone link of the service provider associated with the location-based information to the mobile device; and
- the mobile device further configured to receive the telephone link of the service provider associated with the location-based information from the set of servers.

21. The system of claim 20, wherein the telephone link is a link to a Voice over Internet Protocol (VoIP) server to make a call.

22. The system of claim 16, the mobile device further configured to display a map associated with the location-based information on the mobile device.

23. The system of claim 16, wherein activating geotagging of at least a portion of the content comprises activating geotagging of a first set of content types, the mobile device further configured to receive a user selection for deactivating geotagging of a second set of content types, wherein geotagging said at least a portion of the content comprises geotagging content types in the first set of content types.

24. The system of claim 23, wherein content types generated at the mobile device comprise one or more of pictures, audios, videos, and text.

25. The system of claim 16, the mobile device further configured to activate geotagging for content generated by a first set of applications and deactivate geotagging for content generated by a second set of applications, wherein geotagging said at least a portion of the content comprises geotagging content generated by the applications in the first set of applications.

26. The system of claim 16, wherein enabling time-stamping of at least a portion of the content comprises activating time-stamping of a first set of content types, the mobile device further configured to:
- deactivate time-stamping of a second set of content types in response to receiving a user selection for deactivating time-stamping of the second set of content types, wherein time-stamping at least a portion of the content comprises time-stamping content types in the first set of content types.

27. The system of claim 16, the mobile device further configured to:
- activate time-stamping for content generated by a first set of applications and deactivating time-stamping for content generated by a second set of applications; and
- time-stamp, by the mobile device, at least a portion of the content,
- wherein sending the content from the mobile device to the set of servers further comprises sending the time-stamp associated with the content from the mobile device to the set of server,
- wherein receiving location-based information at the mobile device comprises receiving location-based information at the mobile device from the set of servers based on a location of the mobile device derived from the time-stamp received by the set of servers from the mobile device.

28. The system of claim 16, wherein geotagging at least a portion of the generated content comprises geotagging the portion of the generated content with an orientation of the mobile device in three dimensions.

29. The system of claim 16, wherein an accuracy of said indirectly determined location of the mobile device by the set of servers decreases with increasing of an elapsed time since location reporting is disabled at the mobile device.

30. The system of claim 16, wherein disabling location reporting from the mobile device comprises disabling live tracking of the location of the mobile device.

* * * * *